United States Patent
Li et al.

(10) Patent No.: US 9,749,706 B2
(45) Date of Patent: Aug. 29, 2017

(54) ENHANCED DISTORTION SIGNALING FOR MMT ASSETS AND ISOBMFF WITH IMPROVED MMT QOS DESCRIPTOR HAVING MULTIPLE QOE OPERATING POINTS

(71) Applicant: Samsung Electronics Co., Ltd., Suwon-si, Gyeonggi-do (KR)

(72) Inventors: Zhu Li, Plano, TX (US); Imed Bouazizi, Plano, TX (US); Kyungmo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/546,906

(22) Filed: Nov. 18, 2014

(65) Prior Publication Data

US 2015/0281801 A1 Oct. 1, 2015

Related U.S. Application Data

(60) Provisional application No. 61/970,190, filed on Mar. 25, 2014, provisional application No. 61/970,196, filed on Mar. 25, 2014.

(51) Int. Cl.
*H04N 7/173* (2011.01)
*H04N 21/647* (2011.01)
(Continued)

(52) U.S. Cl.
CPC ..... *H04N 21/64792* (2013.01); *G11B 27/034* (2013.01); *H04N 21/2343* (2013.01);
(Continued)

(58) Field of Classification Search
CPC ....... H04N 21/64738; H04N 21/64792; H04N 21/2343; H04N 21/2662; H04N 21/2407;
(Continued)

(56) References Cited

U.S. PATENT DOCUMENTS 7,822,119 B2 * 10/2010 Boon ................... H04N 19/593
375/240.01
7,830,959 B2 * 11/2010 Park ..................... H04N 19/105
375/240.12
(Continued)

OTHER PUBLICATIONS

International Search Report, dated May 21, 2015, in connection with International Application No. PCT/KR2015/002930, 3 pages.
(Continued)

*Primary Examiner* — Michael B Pierorazio

(57) ABSTRACT

A method for providing media content in a computer network includes storing the media content, where the media content includes a segment having a group of frames. The method also includes determining a transmission rate for traffic to a client device. The method further includes selecting a subset of frames to drop from the group of frames based on (i) the transmission rate and (ii) a frame difference distortion (FDIFF) metric of each frame in the subset of frames. The method also includes shaping the segment by dropping the selected subset of frames from the group of frames, where the shaped segment has a lower bitrate than the segment. In addition, the method includes transmitting the shaped segment to the client device.

18 Claims, 15 Drawing Sheets

(51) Int. Cl.
| | |
|---|---|
| *H04N 21/643* | (2011.01) |
| *H04N 21/61* | (2011.01) |
| *H04N 21/2662* | (2011.01) |
| *H04N 21/2343* | (2011.01) |
| *H04N 21/24* | (2011.01) |
| *G11B 27/034* | (2006.01) |

(52) U.S. Cl.
CPC . *H04N 21/234381* (2013.01); *H04N 21/2404* (2013.01); *H04N 21/2407* (2013.01); *H04N 21/2662* (2013.01); *H04N 21/6125* (2013.01); *H04N 21/64322* (2013.01); *H04N 21/64738* (2013.01)

(58) Field of Classification Search
CPC ..... H04N 21/234381; H04N 21/64322; H04N 21/2404; H04N 21/6125
USPC .......................................................... 725/109
See application file for complete search history.

(56) References Cited

U.S. PATENT DOCUMENTS

| | | | | |
|---|---|---|---|---|
| 2002/0071434 A1* | 6/2002 | Furukawa | ............... | H04L 29/06 370/392 |
| 2003/0123557 A1* | 7/2003 | De With | ............... | H04N 19/60 375/240.27 |
| 2003/0159139 A1* | 8/2003 | Candelore | .............. | H04N 7/162 725/25 |
| 2004/0003178 A1* | 1/2004 | Magoshi | ............. | G06F 12/0875 711/137 |
| 2004/0010614 A1* | 1/2004 | Mukherjee | ........ | H04L 29/06027 709/231 |
| 2004/0022543 A1* | 2/2004 | Hosking | ............ | H04B 10/0799 398/135 |
| 2005/0036543 A1* | 2/2005 | Vetro | ............... | H04N 21/21805 375/240.01 |
| 2005/0036547 A1* | 2/2005 | Vetro | ............... | H04N 21/21805 375/240.12 |
| 2005/0076136 A1* | 4/2005 | Cho | .................. | H04L 29/06027 709/231 |
| 2005/0219253 A1* | 10/2005 | Piazza | .................... | G09G 5/363 345/557 |
| 2007/0154065 A1* | 7/2007 | Kellerer | ............. | H04N 21/2662 382/100 |
| 2008/0031329 A1* | 2/2008 | Iwata | ................... | H04N 19/176 375/240.12 |
| 2008/0094419 A1* | 4/2008 | Leigh | ..................... | G09G 3/007 345/660 |
| 2008/0123750 A1* | 5/2008 | Bronstein | .............. | H04N 19/17 375/240.24 |
| 2008/0205856 A1* | 8/2008 | Kim | ................. | H04N 21/44004 386/290 |
| 2009/0094658 A1* | 4/2009 | Kobayashi | ............. | H04N 5/775 725/118 |
| 2010/0091836 A1* | 4/2010 | Jia | .......................... | H04N 19/44 375/240.01 |
| 2010/0091880 A1* | 4/2010 | Jia | .......................... | H04N 19/44 375/240.25 |
| 2010/0098155 A1* | 4/2010 | Demircin | ............ | H03M 7/4006 375/240.02 |
| 2010/0118945 A1* | 5/2010 | Wada | ................... | H04N 19/176 375/240.12 |
| 2010/0128797 A1* | 5/2010 | Dey | ...................... | H04N 19/176 375/240.24 |
| 2010/0189603 A1* | 7/2010 | Glazier | ................... | B82Y 15/00 422/82.05 |
| 2010/0195922 A1* | 8/2010 | Amano | ................. | H04N 19/176 382/233 |
| 2010/0246683 A1* | 9/2010 | Webb | .................... | H04N 19/895 375/240.16 |
| 2010/0260263 A1* | 10/2010 | Kotaka | ............ | H04N 19/00175 375/240.15 |
| 2010/0321428 A1* | 12/2010 | Saito | ..................... | G06K 15/102 347/9 |
| 2011/0182523 A1* | 7/2011 | Kim | .................. | H04N 19/00042 382/233 |
| 2011/0267951 A1* | 11/2011 | Stanwood | ............ | H04L 41/5022 370/235 |
| 2012/0013748 A1* | 1/2012 | Stanwood | ............ | H04L 41/5022 348/192 |
| 2012/0151540 A1* | 6/2012 | Stanwood | ................ | H04L 65/00 725/109 |
| 2013/0086279 A1* | 4/2013 | Archer | .................... | H04L 69/14 709/233 |
| 2013/0089107 A1* | 4/2013 | Li | ........................... | H04L 65/80 370/412 |
| 2013/0216144 A1* | 8/2013 | Robinson | .............. | G06T 7/2053 382/233 |

OTHER PUBLICATIONS

Written Opinion of the International Searching Authority, dated May 21, 2015, in connection with International Application No. PCT/KR2015/002930, 5 pages.

Jins Kim,et al., "QoE-aware Triple Play Service at U-Home Environment", ICEIC, Jun. 2010, 4 pages (253-256).

Lorenzo Cappellari et al., "Optimal Motion Compensation for Low Bit Rate Wavelet Based Error Frame Coding", Signals, Systems and Computers, Oct. 28 2005-Nov. 1 2005, 6 pages.

* cited by examiner

ENHANCED DISTORTION SIGNALING FOR MMT ASSETS AND ISOBMFF WITH IMPROVED MMT QOS DESCRIPTOR HAVING MULTIPLE QOE OPERATING POINTS

CROSS-REFERENCE TO RELATED APPLICATIONS AND CLAIM OF PRIORITY

This application claims priority under 35 U.S.C. §119(e) to the following U.S. provisional patent applications:
  U.S. Provisional Patent Application Ser. No. 61/970,190 filed on Mar. 25, 2014 and entitled "ENHANCED DISTORTION SIGNALLING FOR MMT ASSETS AND ISOBMFF;" and
  U.S. Provisional Patent Application Ser. No. 61/970,196 filed on Mar. 25, 2014 and entitled "MMT QOS DESCRIPTOR WITH MULTIPLE QOE OPERATING POINTS."
Both of these provisional patent applications are hereby incorporated by reference in their entirety.

TECHNICAL FIELD

This disclosure relates generally to video content delivery systems. More specifically, this disclosure relates to enhanced distortion signaling for Moving Picture Experts Group (MPEG) Media Transport (MMT) assets and International Organization for Standardization (ISO) base media file format (ISOBMFF) with an improved MMT quality of service (QoS) descriptor having multiple quality of experience (QoE) operating points.

BACKGROUND

Users desire to receive high definition (HD) or ultra-high definition (UHD) video content over the Internet. The current state of the Internet supports streaming of HD or UHD quality video, but congestion of communication links is one of many problems caused by limited bandwidth. Internet networks often accelerate delivery of video content by reducing the transmission rate of the video content streamed to an end user client device. Moving Picture Experts Group (MPEG) Media Transport (MMT) is a multimedia transport that supports advanced features such as content-aware streaming, content-aware networking, and layer-aware forward error correction (FEC). When a network is congested, the advanced features of MMT enable a transmitting device to both reduce the transmission rate by dropping certain packets and to control quality degradation by using metrics to select less important packets to be dropped. Peak signal-to-noise ratio (PSNR) and structural similarity (SSIM) are metrics that characterize quantization-induced distortion. However, the PSNR and SSIM metrics do not characterize the distortion induced by frame drops, which is different from quantization-induced distortion.

In MMT, an Asset Delivery Characteristic (ADC) entity includes quality of service (QoS) parameters to alleviate bottlenecks and to facilitate better network router operation in content-aware traffic shaping. The current state of the Internet transmits the ADC (including QoS infatuation) at the asset level, but routers can operate at a different level of granularity (namely, a segment level that is finer than the asset level). Also, the current ADC entity does not include information that specifies the streaming time packet drop decisions and consequences in quality of experience (QoE).

SUMMARY

In a first embodiment, an apparatus for providing media content in a computer network includes a memory configured to store the media content, where the media content includes a segment having a group of frames. The apparatus also includes at least one processing device configured to determine a transmission rate for traffic between the apparatus and a client device. The at least one processing device is also configured to select a subset of frames to drop from the group of frames based on (i) the transmission rate and (ii) a frame difference distortion (FDIFF) metric of each frame in the subset of frames. The at least one processing device is further configured to shape the segment by dropping the selected subset of frames from the group of frames, where the shaped segment has a lower bitrate than the segment. In addition, the at least one processing device is configured to initiate transmission of the shaped segment to the client device.

In a second embodiment, a system for providing media content in a computer network includes a memory configured to store the media content, where the media content includes a segment having a group of frames. The system also includes at least one processing device configured to generate multiple operating points of bitrate reduction by performing a gradient search for each of the operating points. The at least one processing device is also configured to generate a set of Quality of Experience (QoE) parameters for each of the operating points. The at least one processing device is further configured to initiate transmission of an Asset Delivery Characteristic (ADC), where the ADC includes the operating points and the set of QoE parameters corresponding to each of the operating points.

In a third embodiment, a method for providing media content in a computer network includes storing the media content, where the media content includes a segment having a group of frames. The method also includes determining a transmission rate for traffic to a client device. The method further includes selecting a subset of frames to drop from the group of frames based on (i) the transmission rate and (ii) a frame difference distortion (FDIFF) metric of each frame in the subset of frames. The method also includes shaping the segment by dropping the selected subset of frames from the group of frames, where the shaped segment has a lower bitrate than the segment. In addition, the method includes transmitting the shaped segment to the client device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The teen "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
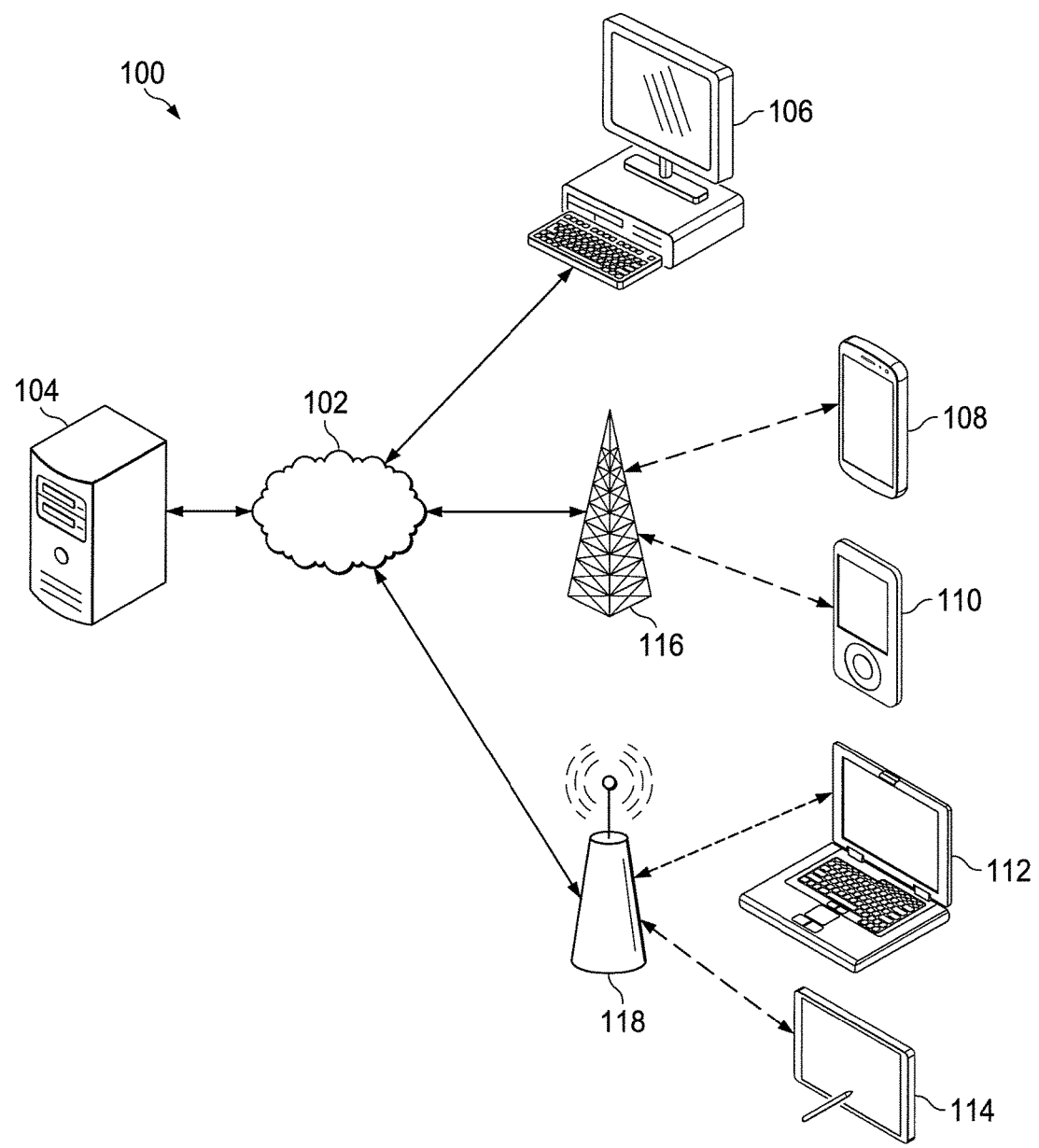
FIG. 1 illustrates an example computing system according to this disclosure.

FIGS. 1 through 16, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated by reference into this disclosure as if fully set forth herein:

ISO/IEC JTC 1/SC29 IS 23008-1, Info Technology—High efficiency coding and media delivery in heterogeneous environments—part 1: MPEG media transport (MMT) ("REF1");

ISO/IEC DIS 23008-10: Information technology—High efficiency coding and media Delivery in heterogeneous environments—Part 10: MPEG Media Transport Forward Error Correction (FEC) codes ("REF2");

Wang et al., "Image quality assessment: from error visibility to structural similarity," IEEE Transactions on Image Processing, vol. 13, no. 4, April 2004 ("REF3"); and ISO/IEC JTC1/SC29/WG11/MPEG2013/N13992, Reznik et al., "WD of ISO/IEC XXXXX-Y: Carriage of quality-related information in the ISO Based Media File Format" ("REF4").

In MMT, a media fragment unit (MFU) priority field enables single flow streaming optimization but does not capture the distortion induced by frame drop. Also, without a common quality of experience (QoE) metric regarding frame drops, it is difficult for computer networks to make content-aware decisions on traffic shaping. That is, an Asset Delivery Characteristic (ADC) includes a bit stream description and a quality of service (QoS) description but lacks a QoE description.

This disclosure modifies the MMT hint track to carry information of visual impacts if loss distortion incurs. A frame loss distortion metric (also referred to as a frame drop distortion metric) measures the frame drop visual impact from training a distance metric. A frame loss distortion metric can also account for decoding dependency. As described below, frame loss distortion metrics that characterize a temporal distortion per sample (such as per frame, per segment, or per group of frames) of a video sequence provide technical advantages of finer granularity of ADC signaling and enables an ADC signal to include multiple QoE operating points with associated media fragment unit (MFU) index and bitrate.

This disclosure provides systems and methods that increase the degree of freedom of video adaptation in streaming. Embodiments of this disclosure provide a distortion signaling mechanism in an MMT hint track to characterize the distortion from frame drops. Embodiments of this disclosure provide a packet loss-induced distortion metric that characterizes the impact a combination of frame drops has on a human's visual perception. The packet loss-induced distortion metric is used to optimize multi-flow streaming over a bottleneck in a communication link. For example, the packet loss-induced distortion metric is a tool for optimizing the streaming time and for supporting content-aware video adaptation in modern media transport, especially for coordinating multi-flow video sessions at the bottleneck. A unified distortion metric that can measure the consequences of packet loss provides technical advantages to a set of well-established optimization tools in networking. The packet loss-induced distortion metric can be a new field added to the ISOBMFF document of REF4 as part of the quality information. That is, the frame drop-induced distortion including an accounting for decoding dependence enables more advanced content-aware video networking solutions.

As an example, a QoE metric labeling for packet loss consequences or delay consequences and finer (than asset level) granularity of operation is more suitable for stateless routers. The QoE metric labeling can be used to support content-aware video traffic shaping and routing in modern content delivery networks (CDN). To facilitate more intelligent video queue pruning and more intelligent packet dropping operations, this disclosure modifies the MMT ADC to operate at a MOOF segment level and modifies the MMT ADC to include a spatio-temporal QoE quality metric field and a QoE operating points descriptor. According to this disclosure, the ADC (including QoE information) is transmitted at a finer (more granular) segment level that is better suited for the "memory-less" characteristic of routers. For example, the MMT ADC (including QoE information) enables a multi-QoS traffic shaping with different spatio-temporal distortion levels to allow for both single flow QoE optimization for the given QoS, and multi-flow QoE optimization at a bottleneck.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, the computing system 100 generates metrics that characterize the temporal distortion per sample of a video sequence. This can be used, for example, to provide an improved MMT QoS descriptor having multiple QoE operating points.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
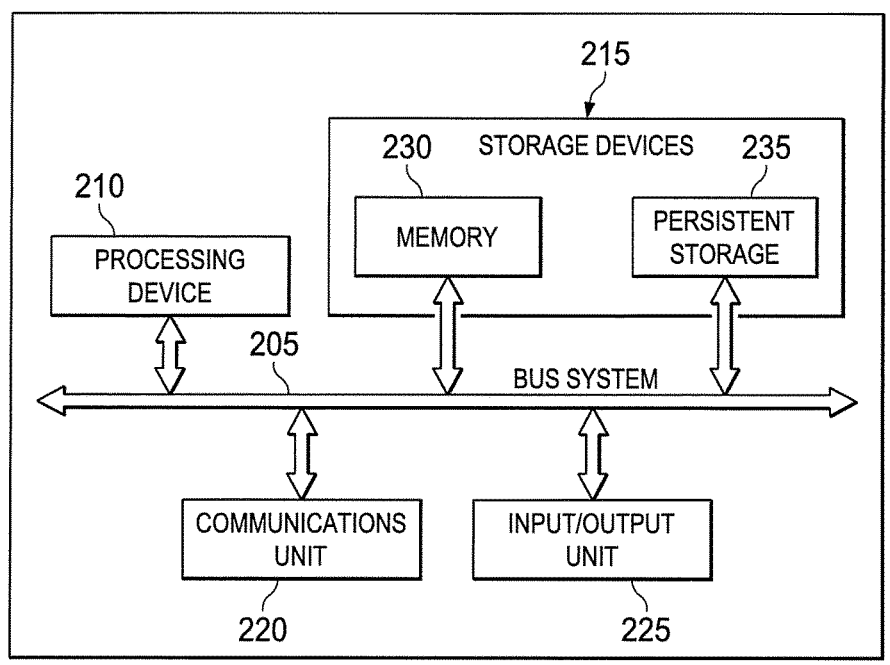
FIGS. 2 and 3 illustrate example devices in a computing system according to this disclosure.
Figure 3:
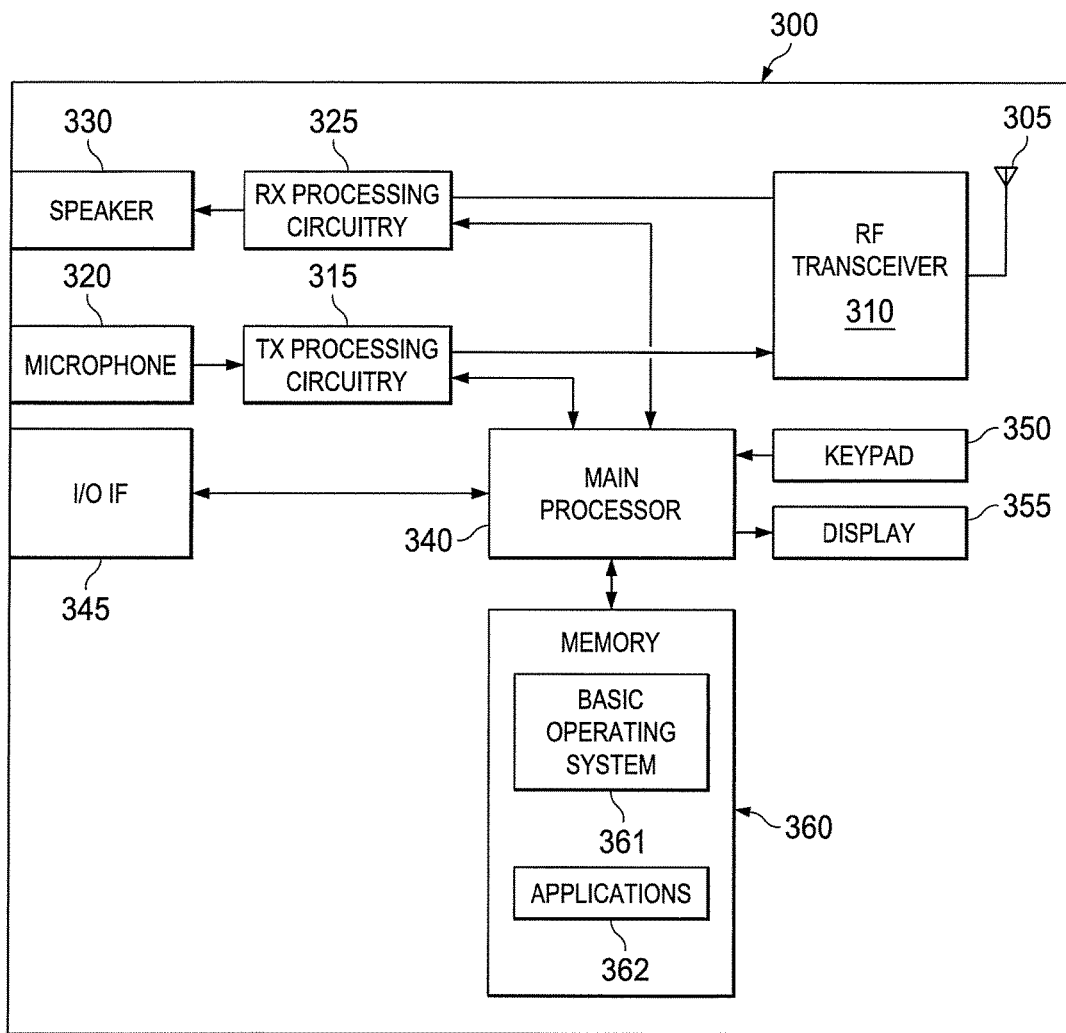

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the client device 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for generating metrics that characterize the temporal distortion per sample of a video sequence. The main processor 340 can move data into or out of the memory 360 as required by an executing process. In some embodiments, the main processor 340 is configured to execute the applications 362 based on the OS program 361 or in response to signals received from external devices or an operator. The main processor 340 is also coupled to the I/O interface 345, which provides the client device 300 with the ability to connect to other devices such as laptop computers and handheld computers. The I/O interface 345 is the communication path between these accessories and the main controller 340.

The main processor 340 is also coupled to the keypad 350 and the display unit 355. The operator of the client device 300 can use the keypad 350 to enter data into the client device 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

As described in more detail below, the computing system generates frame loss temporal distortion (FLTD) metrics that characterize the temporal distortion per sample of a video sequence. This can be used, for example, to support an improved MMT QoS descriptor having multiple QoE operating points.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
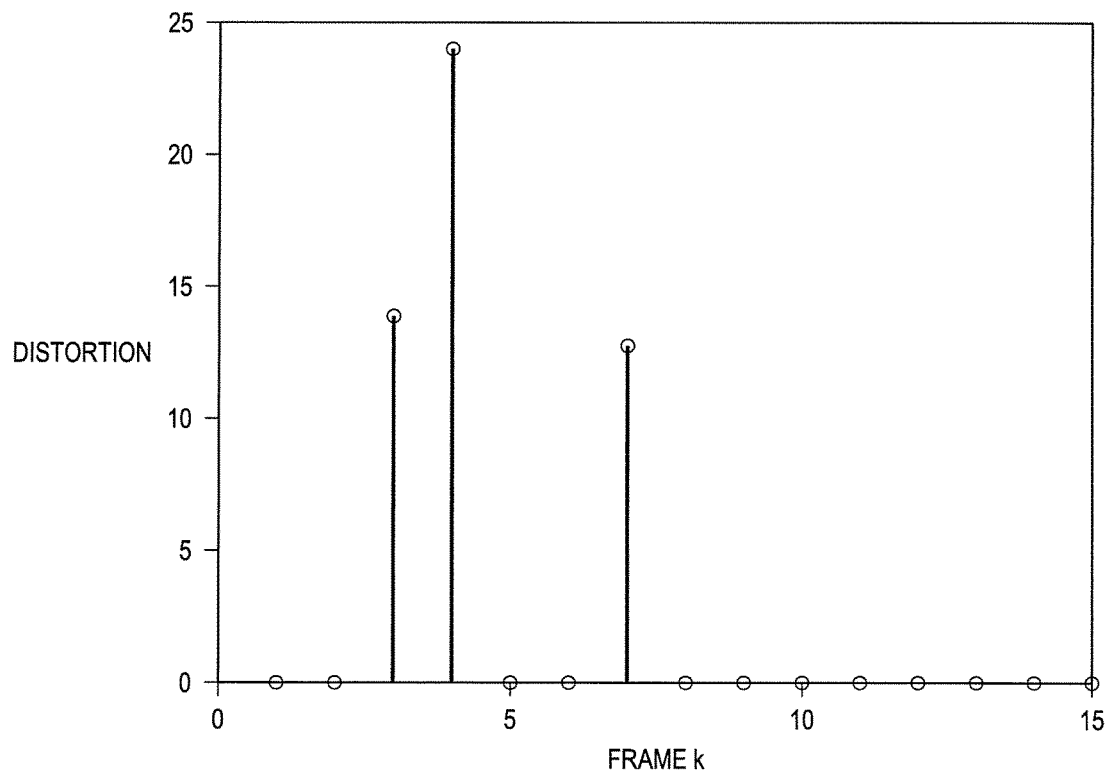
FIG. 4 illustrates a graph of frame drop-induced distortion per frame for an example group of frames according to this disclosure.

FIG. 4 illustrates a graph of frame drop-induced distortion per frame for an example group of frames (GOF) (also referred to as "group of pictures" or "GOP") according to this disclosure. The graph shown in FIG. 4 is for illustration only. Graphs of other example GOFs could be used without departing from the scope of this disclosure.

In FIG. 4, the GOF includes a set of 15 frames $\{f_1, f_2, \ldots, f_{15}\}$. A subset of the frames are lost, such as when frames of the subset $\{f_3, f_4, f_7\}$ are dropped or lost. Based on a $0^{th}$ hold playback, a user will see a shaped GOF $\{f_1, f_2, f_2, f_2, f_5, f_6, f_6, f_8, f_9, \ldots, f_{15}\}$ at playback timestamps $\{t_1, t_2, t_3, t_4, t_5, t_6, t_7, t_8, t_9, \ldots, t_{15}\}$. As shown in FIG. 4, the horizontal axis (x-axis) represents the frame index k of the frames in the video sequence of the GOF, and the vertical axis (y-axis) represents the frame loss temporal distortion (FLTD) incurred as a consequence of dropping the subset of frames $\{f_3, f_4, f_7\}$. The distortion introduced at playback timestamp $t_3$ is $d(f_2, f_3)$, which is a function representing what humans perceive in the frame difference. Further, the distortion is $d(f_2, f_4)$ at time stamp $t_4$, and the distortion is $d(f_6, f_7)$ at timestamp $t_7$. The FLTD function $d(f_j, f_k)$, represents what a human would perceive in how much frames are changed (i.e., frame difference).

The level of temporal distortion is content-dependent. For example, frame drops will induce a small level of distortion in stationary sequences having relatively little video sequence activity, yet frame drops will induce larger distortions for more active video sequences. A mean square error (MSE) metric or an SSIM metric are not good metrics for determining temporal distortion as a simple one-half picture element (pel) global motion shift will result in a large MSE difference while a human's perception of the change is actually very small. REF3 describes that a thumbnail image Eigen appearance space metric is used to capture this distortion perceived by a human. That is, the Eigen appearance space metric is an effective metric for characterizing human perceptions and visual impacts.

The FLTD incurred is a consequence of the event when a frame $f_j$ (such as a previous frame that is not dropped) is actually shown to the user and the frame $f_k$ corresponding to the timestamp $t_k$ would be shown to the user unless the frame $f_k$ is dropped. The FLTD incurred for frames $f_j$ and $f_k$ can be a frame difference distortion (FDIFF) that is computed according to the differential function $d(f_j, f_k)$ expressed as follows:

$$d(f_j, f_k) = (S \cdot f_j - S \cdot f_k)^T A^T A (S \cdot f_j - S \cdot f_k) \quad (1)$$

In Equation (1), S is the bi-cubicle smoothing and down-sampling operator that brings the frames to an h×w thumbnail, and the distance metric A is the 192×k Eigen appearance projection with a basis from the largest k eigenvalue principle components. For example, an 8-bit integer value is computed from a scaling function within Equation (1) in combination with a projection function within Equation (1). The scaling function is where the bi-cubicle smoothing and down-sampling scales the frame to a thumbnail having a height (h=12) and a width (w=16). The projection function is where the distance is projected by the Eigen appearance projection according to the 12×196 subspace of the A metric.

Figure 5:
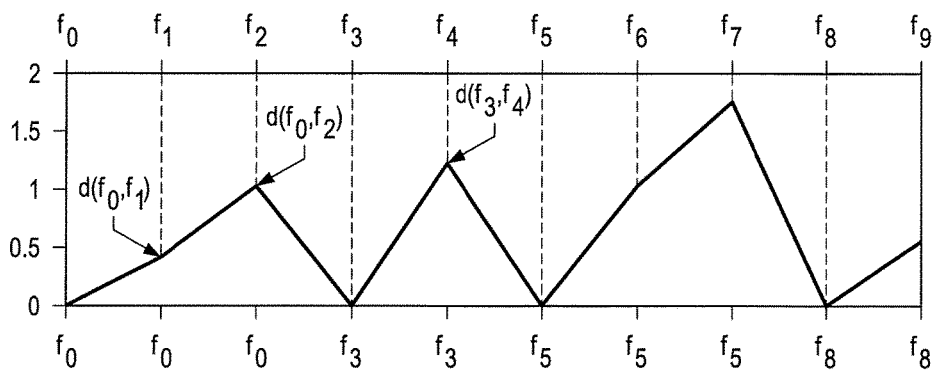
FIG. 5 illustrates a graph of a number of picture elements of frame drop-induced distortion per frame for another example group of frames according to this disclosure.

FIG. 5 illustrates a graph of a number of picture elements (pels) of frame drop-induced distortion per frame for another example GOF according to this disclosure. The graph shown in FIG. 5 is for illustration only. Graphs of other example GOFs could be used without departing from the scope of this disclosure.

In FIG. 5, the GOF includes of a set of 10 frames $\{f_0, f_1, \ldots, f_9\}$. A subset of the frames are lost, such as when frames of the subset $\{f_1, f_2, f_4, f_6, f_7, f_9\}$ are dropped or lost. During playback, a user will see a shaped GOF $\{f_0, f_0, f_0, f_3, f_3, f_5, f_5, f_5, f_8, f_8\}$ at playback timestamps $\{t_0, t_1, t_2, t_3, t_4, t_5, t_6, t_7, t_8, t_9\}$. As shown in FIG. 5, the top horizontal axis (x-axis) represents the frame index k of the frames in the video sequence of the original GOF and the timestamps for the playback. The bottom horizontal axis shows the frame index j that the user will see at each timestamp. The vertical axis (y-axis) represents the number of picture elements of FLTD incurred as a consequence of dropping the subset of frames $\{f_1, f_2, f_4, f_6, f_7, f_9\}$. The distortion introduced at playback timestamp $t_1$ is $d(f_0, f_1)$, which is a function of what humans perceive in the frame difference. The distortion is $d(f_0, f_2)$ at time stamp $t_2$, the distortion is $d(f_3, f_4)$ at timestamp $t_4$, and so forth for timestamps $t_6, t_7,$ and $t_9$.

FIGS. 6A-6D illustrate frames from example video sequences according to this disclosure. In FIGS. 6A-6D, each frame is one from a segment having 300 frames in a sequence. The embodiments of the videos represented in FIGS. 6A-6D are for illustration only. Other embodiments could be used without departing from the scope of this disclosure.

Figure 6A:
FIGS. 6A-6D illustrate frames from example video sequences according to this disclosure.
Figure 6B:
Figure 6C:
Figure 6D:

FIG. 6A illustrates a frame 601 from a video in a documentary titled "dienbienphu." FIG. 6B illustrates a frame 602 from a video in a documentary titled "foreman." FIG. 6C illustrates a frame 603 from a video in a documentary titled "korolev." FIG. 6D illustrates a frame 604 from a video in a documentary titled "me-109." The video sequence in each of the example segments has a different mixture of activity levels.

FIGS. 7A-7D illustrate graphs of frame significance per frame from the example video sequences of FIGS. 6A-6D, and FIG. 7E illustrates a graph of the frame significance for the first 240 frames of the example video segments from FIGS. 6B-6C according to this disclosure. The graphs illustrated in FIGS. 7A-7E are for illustration only. Other embodiments could be used without departing from the scope of this disclosure.

The frame significance (FSIG) characterizes the relative importance of frames in a video sequence, and the sequence level visual impact from various combinations of frame losses (such as from dropping a temporal layer) can be estimated from the frame differential distance $d(f_k, f_{k-1})$ (which denotes a representation of the frame significance). By definition, the frame significance value $v_k$ for a sequence of frames $\{f_1, f_2, \ldots f_n\}$ can be expressed as follows:

$$v_k = d(f_k, f_{k-1}) \quad (2)$$

In Equation (2), $d(f_k, f_{k-1})$ is the frame difference function of two successive frames in the sequence. It is the differential function $d(f_j, f_k)$ of Equation (1) that represents the rate of change in the sequence and is calculated from the Eigen appearance metric of the scaled thumbnails of the frames.

In FIGS. 7A-7D, the frame significance of a frame is measured by the frame differential distance $d(f_k, f_{k-1})$. As shown here, each horizontal axis represents the frame index k for the 300 frames of the segments represented in FIGS. 6A-6D. That is, the horizontal axis has a domain of frame indices for k={1, 2, ..., 300}. The vertical axis represents the significance of each frame. More particularly, the vertical axis represents the differential distance $d(f_k, f_{k-1})$ of each frame. The frame differential difference $d(f_k, f_{k-1})$ is quantified on a scale from 0 to 128, where zero corresponds to a least significance and no distortion. The frame differential difference $d(f_k, f_{k-1})$ provides a good profile of the video sequence activity. More specifically, the frame significance (FSIG) value is an example metric that measures the frame differential difference between a frame in the segment and its immediately preceding frame for the event when the immediately preceding frame $f_{k-1}$ is actually shown to the user because the frame $f_k$ corresponding to the timestamp $t_k$ has been dropped. That is, the FSIG value is the temporal distortion of the frame $(f_k=f_t)$ corresponding to the timestamp t if the current frame $f_t$ is lost. The FSIG of a frame $f_k$ can be expressed as follows:

$$v_k = d(f_k, f_{k-1}) = (S \cdot f_k - S \cdot f_{k-1})^T A^T A (S \cdot f_k - S \cdot f_{k-1}) \quad (3)$$

As an example, in the segment represented by FIG. 6B, the first 100 frames correspond to a talking head, a hand is waving at approximately frame 150, a large camera panning motion occurs, and the last 50 frames show a stationary brick house. Accordingly, during the first 100 frames, each frame changes by a small amount from the previous frame as shown by the low FSIG values in FIG. 7B. At approximately frame 150, the frame changes by a large amount from the previous frame, as shown by the steep high inclines and steep deep declines of the line 702 in FIG. 7B.

Figure 7A:
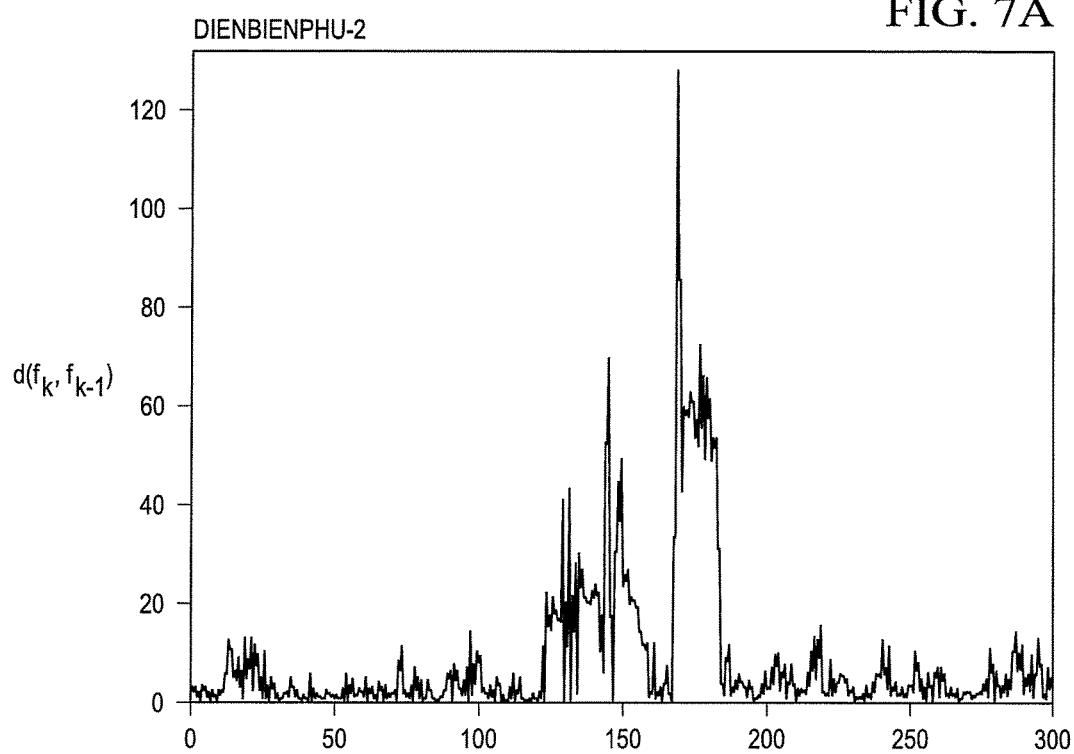
FIGS. 7A-7D illustrate graphs of frame significance per frame from the example video sequences of FIGS. 6A-6D.
Figure 7B:
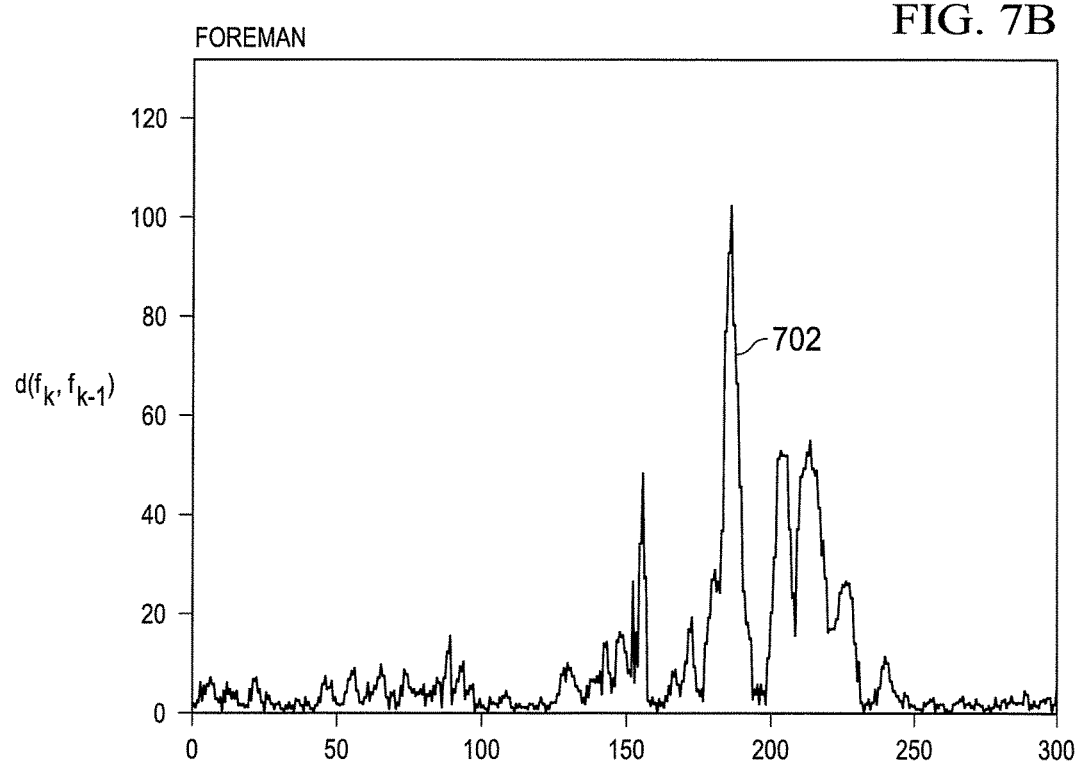
Figure 7C:
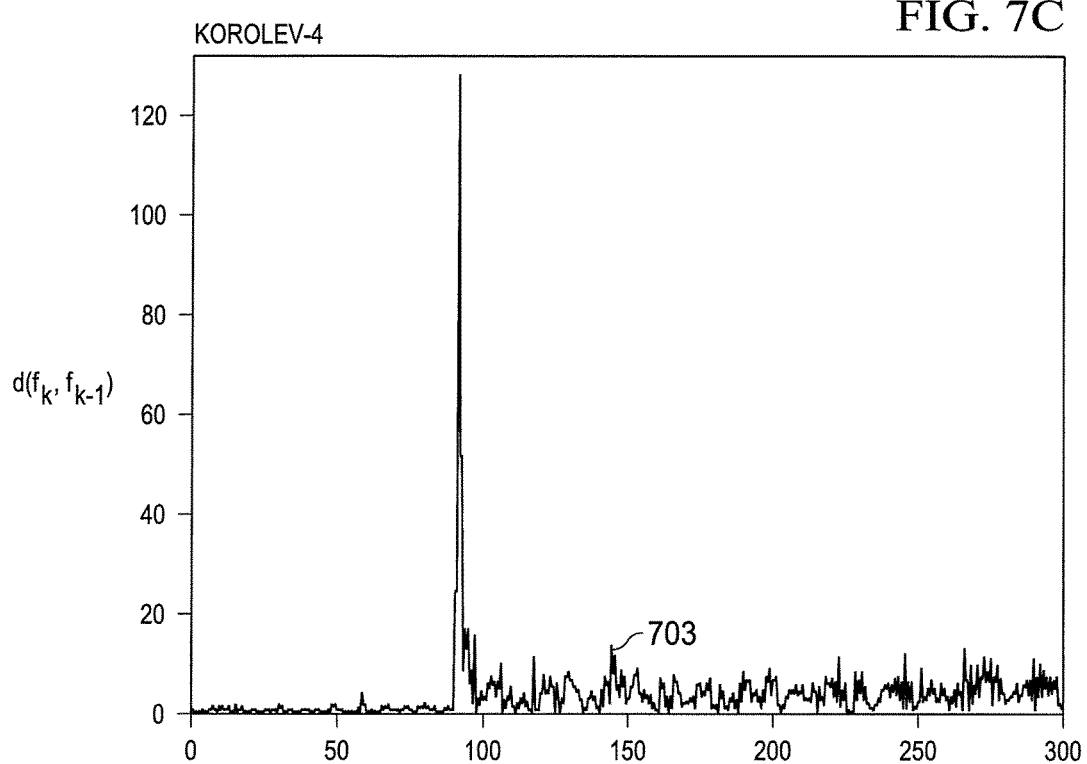
Figure 7D:
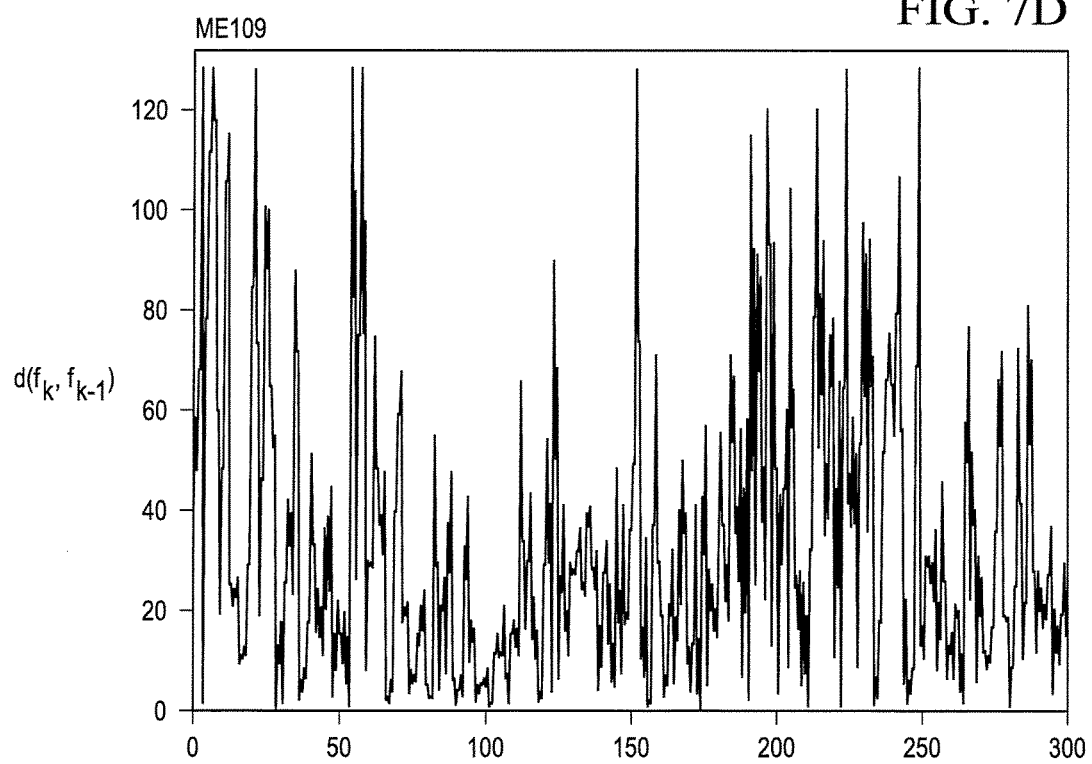
Figure 7E:
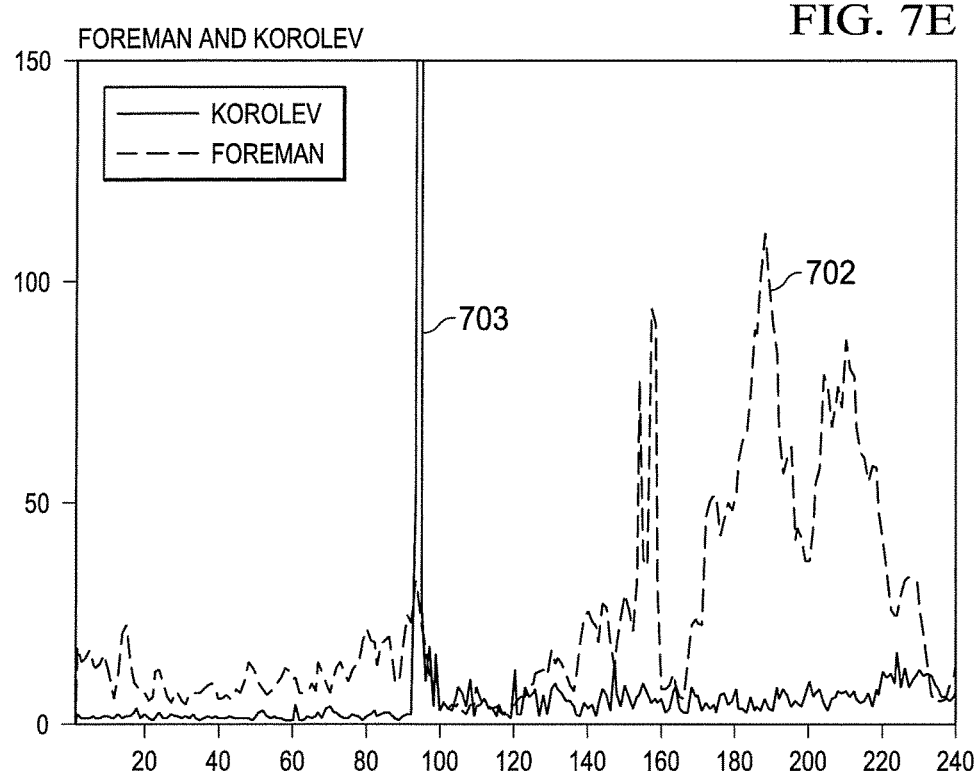
FIG. 7E illustrates a graph of the frame significance for the first 240 frames of the example video segments from FIGS. 6B-6C according to this disclosure.

FIG. 7E illustrates a graph of the frame significance for the first 240 frames of the segment from FIG. 6B and the segment from FIG. 6C. The line 702 represent the frame significance (such as the differential distance) for the frames of the segment of FIG. 6B. A line 703 represents the frame significance for the segment of FIG. 6C. A comparison of the lines 703 and 704 shows that the segment of FIG. 6C has little video sequence activity except at approximately frames 90-97. The segment of FIG. 6B includes a higher level of activity than the segment of FIG. 6C, yet the segment of FIG. 6B has little video sequence activity until approximately frame 150 (as described above).

Figure 8A:
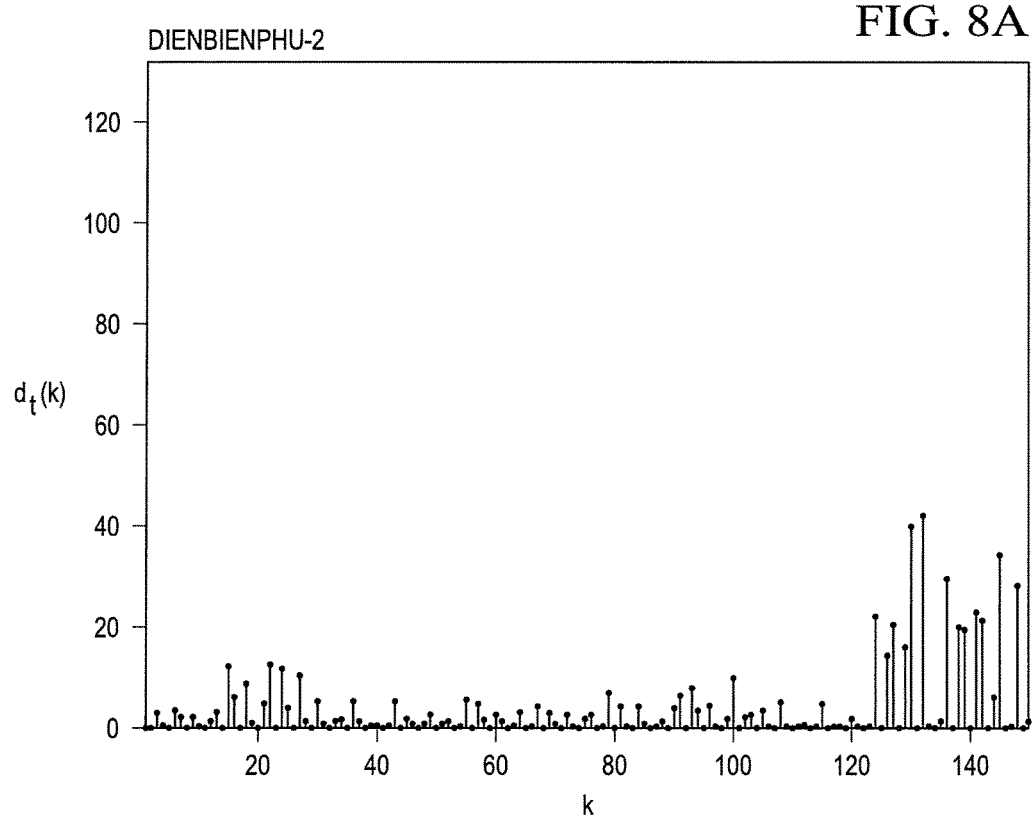
FIGS. 8A-8C illustrate graphs of B-frame-induced temporal distortions per frame corresponding to the example video sequences according to this disclosure.
Figure 8B:
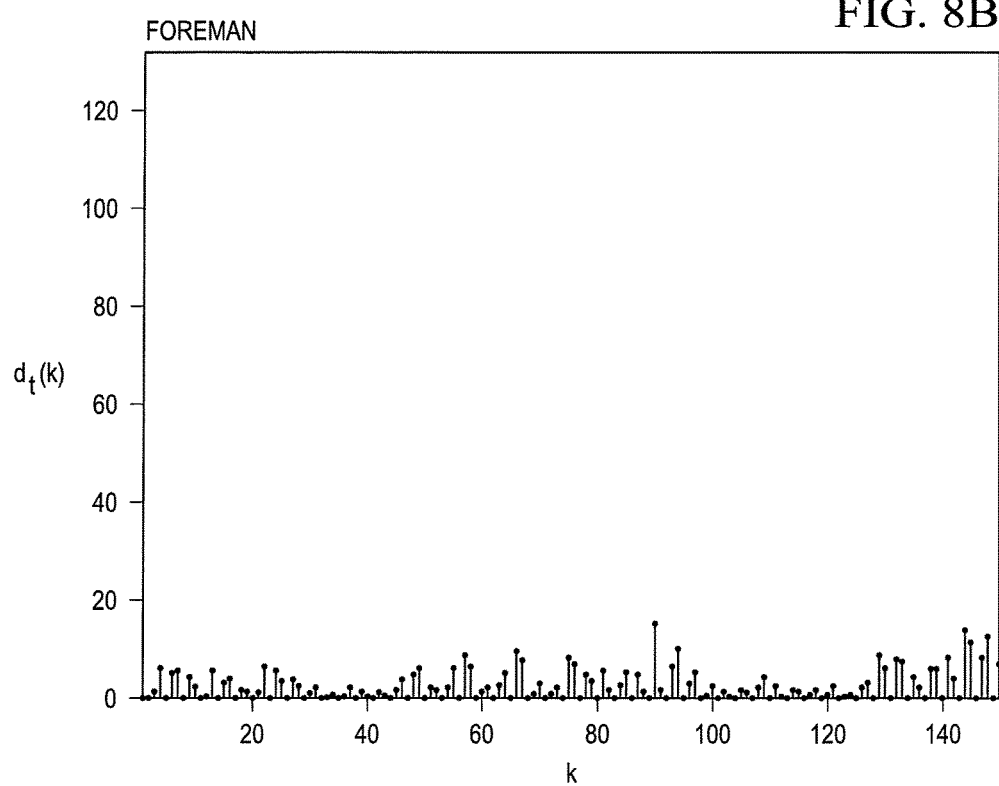
Figure 8C:
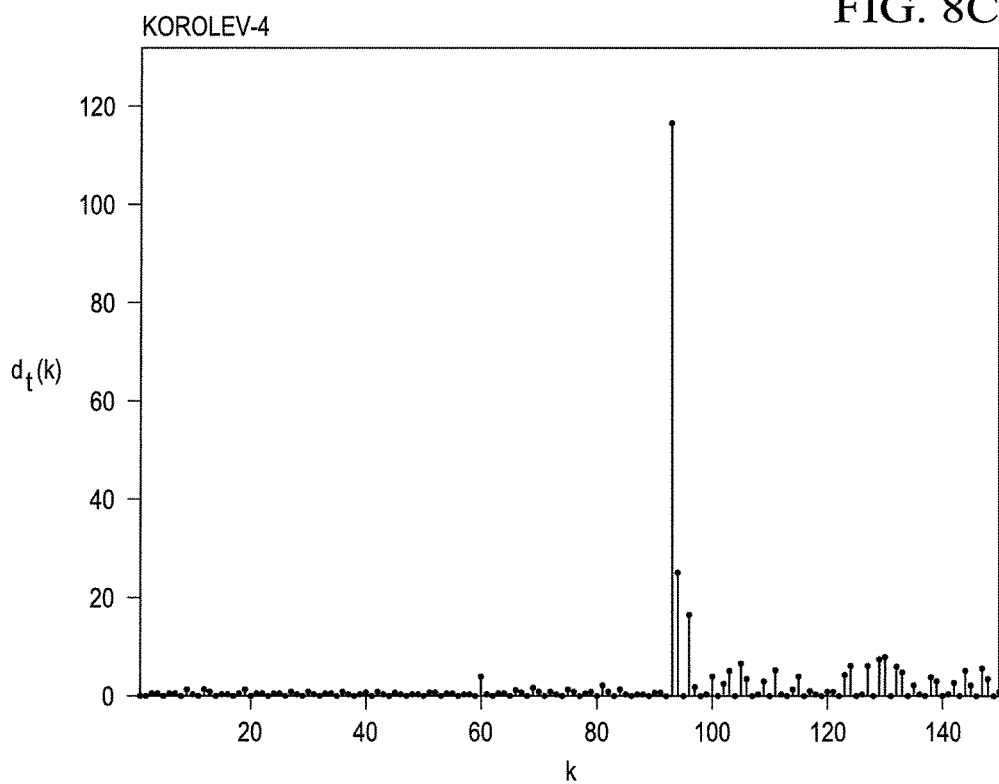

FIGS. 8A-8C illustrate graphs of B-frame-induced temporal distortions per frame corresponding to the example video sequences according to this disclosure. The embodiments of the graphs represented in FIGS. 8A-8C are for illustration only. Other embodiments could be used without departing from the scope of this disclosure.

To conform with the quality-related information format described in REF4, the FLTD information according to embodiments of this disclosure is based on the temporal significance profile and the differential frame difference. That is, in shaping an original segment to form a shaped segment, if the subset of frames dropped from a GOF only includes non-consecutive B-frame losses, the computation of the B-frame loss is a straightforward method of simply looking up the frame significance profile (shown in FIGS. 7A-7E) at the frame loss timestamp. As described below with reference to FIG. 9 and Table 1, if the subset of frames dropped from a GOF only includes consecutive frame losses, the actual loss can be approximated from the differential frame distortion profile by summing the differential distortions with an exponentially decaying function as expressed below.

$$d(f_k, f_{k-p}) = \sum_{j=1}^{p} e^{-a(j-1)} d(f_{t-k+1}, f_{t-k}) \quad (4)$$

Here, the kernel a reflects the temporal masking effects and can be obtained from training to suit different user preferences, t represents the timestamp of a frame shown to the user, p represents a number of frames prior to the $k^{th}$ frame, k represents the frame index of the frame that would be shown to the user (at the corresponding timestamp t=k) unless the frame $f_k$ is dropped.

Table 1 shows an example comparison of the temporal distortion and the approximated temporal distortion $d(f_k, f_{k-p})$ from the differential profile where frames $\{f_t, f_{t+1}, f_{t+2}\}$ are lost.

TABLE 1

Distortion and Approximated Distortion for Consecutive Frame Losses

| Time stamp | Distortion | Approximated Distortion |
|---|---|---|
| t | $d(f_t, f_{t-1})$ | $d(f_t, f_{t-1})$ |
| t + 1 | $d(f_{t+1}, f_{t-1})$ | $d(f_{t+1}, f_t) + e^{-a} d(f_t, f_{t-1})$ |
| t + 2 | $d(f_{t+2}, f_{t-1})$ | $d(f_{t+2}, f_{t-1}) + e^{-a} d(f_{t+1}, f_t) + e^{-2a} d(f_t, f_{t-1})$ |

In some embodiments, for the most recent three frame losses, the set of weights $\{1.0, 0.5, 0.25\}$ replace the set of values $\{e^0, e^{-a}, e^{-2a}\}$ of the exponentially decaying function.

Figure 9:
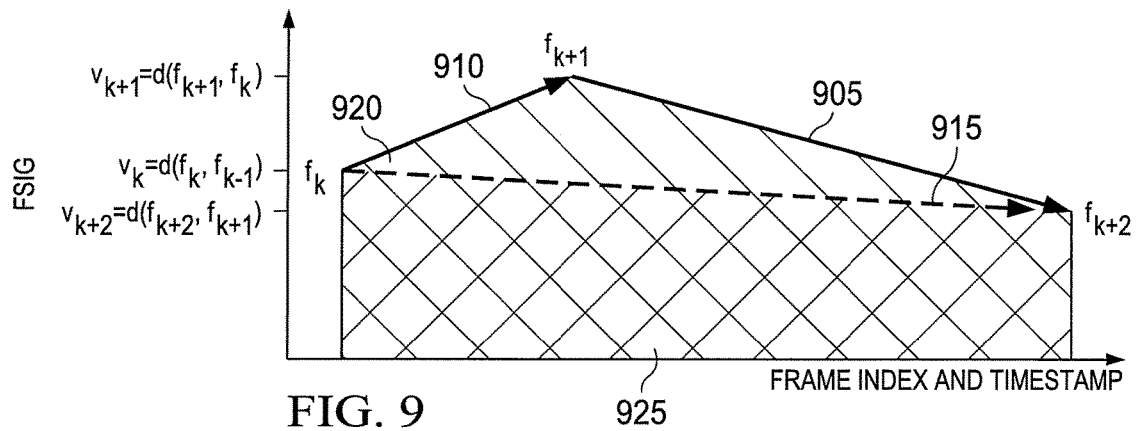
FIG. 9 illustrates an example vector diagram of frame significance (FSIG) values of consecutive lost frames used to calculate a frame loss temporal distortion (FLTD) metric according to this disclosure.

FIG. 9 illustrates an example vector diagram of FSIG values of consecutive lost frames used to calculate an FLTD metric according to this disclosure. The embodiment of the vector diagram shown in FIG. 9 is for illustration only. Other embodiments could be used without departing from the scope of this disclosure.

As shown in FIG. 9, the frames $\{f_{t+1}, f_{t+2}\}$ are lost. A vector 905 represents the frame differential difference corresponding to the frame $(f_{k+2})$, and a vector 910 represents the frame differential difference corresponding to the frame $(f_{k+1})$. A vector 915 represents the cumulative differential difference corresponding to the frame $(f_{k+2})$ for the case of two consecutive frame losses. The vector 905 is added to the vector 910 to generate a vector sum corresponding to the vector 915.

The temporal distortion at timestamp $t_{k+2}$ can be calculated according to various methods, where each method has a different level of precision. In one example, the temporal distortion at timestamp $t_k+_2$ can be calculated using Equation (4) to characterize the QoE impact of different temporal layers in the video sequence as follows.

$$d(f_k, f_{k-p}) = \sum_{j=1}^{p} e^{-a(j-1)} d(f_{t-k+1}, f_{t-k}) \quad (4)$$

$$d(f_{k+2}, f_k) = v_{k+2} + e^{-a} v_{k+1}, \text{ where } k=k-p \text{ and } p=2. \quad (5)$$

In another example, the temporal distortion at timestamp $t_{k+2}$ can be calculated as according to the sum of the temporal distortions corresponding to the individual lost frames. That is, the FLTD can be calculated according to Equation (6) below, where $v_k$ represents the FSIG of the $k^{th}$ frame. The FLTD calculated according to Equation (6) corresponds to an amount of distortion having a value represented by an area 920 (shown as a hatched five-sided polygon beneath the vectors 910 and 905).

$$d(f_k, f_{k+2}) = v_{k+2} + v_{k+1} \quad (6)$$

In another example, the temporal distortion at timestamp $t_{k+2}$ can be calculated according to the vector sum of the temporal distortions corresponding to the consecutively lost frame $(f_{k+2})$ associated with the timestamp $t_{k+2}$ and the frame actually displayed at the timestamp $t_{k+2}$. That is, the FLTD can be calculated according to Equation (7) below, where $\overrightarrow{v_{k+2}}$ represents the vector 905, $\overrightarrow{v_{k+1}}$ represents the vector 910, and $d(f_k, f_{k+2})$ represents the vector 915. The FLTD calculated according to Equation (7) corresponds to an amount of distortion having a value represented by an area 925 (shown as a shaded trapezoid beneath the vector 915).

$$d(f_k, f_{k+2}) = \overrightarrow{v_{k+2} + v_{k+1}} \quad (7)$$

In another example, the temporal distortion at timestamp $t_{k+2}$ can be calculated as according to the absolute value of the projection function (such as defined by the expression $A(S \cdot f_j - S \cdot f_k)$) as expressed in Equation (8). Here, S is a low pass filter and down sampling function, and A is a distance metric that can be determined from QoE information.

$$d(f_j, f_k) = |A^* S^* f_j - A^* S^* f_k| \quad (8)$$

The amount of distortion calculated using Equation (4) closely approximates the amount of distortion that a human would perceive at the timestamps $\{t_k, t_{k+1}, t_{k+2}\}$. By comparison, the amount of distortion calculated using Equation (6) overestimates the amount of distortion that a human would perceive at the timestamps $\{t_k, t_{k+1}, t_{k+2}\}$, where the frames actually shown to the user were $\{f_k, f_k, f_k\}$ because the subset of frames $\{f_{k+1}, f_{k+2}\}$ were dropped. By further comparison, the amount of distortion calculated using Equation (7) overestimates by a lesser amount than when Equation (6) is used. Also, the area 925 is less than the area 920, indicating that the amount of distortion associated with Equation (7) is less than the amount of distortion associated with Equation (6).

Table 2 provides a MMT hint track that carries temporal distortion information according to this disclosure. The importance or significance of a frame can be measured by the amount of distortion (such as if-loss-incurred-distortion) that would be incurred if the frame is dropped or lost from the original segment GOP, which is the FSIG of the frame. According to this disclosure, the FSIG can be transmitted in a signal using only eight bits and can easily be fit into an existing video quality metric (VQME) scheme. For example, the MMT hint track described in REF1 is a suitable place to include the FSIG. More particularly, the semantics for the field on "priority" can be re-interpreted as the if-loss-incurred-distortion (FSIG). The if-loss-incurred-distortion can be quantized to an 8-bit unsigned int representation (shown in Table 2 as "unsigned int(8) priority"). Accordingly, the FSIG information is very useful in supporting content-aware frame drop decisions in streaming applications.

TABLE 2

MMT Hint Track Carrying the Temporal Distortion Information

```
aligned(8) class MMTHSample {
        unsigned int(32) sequence_number;
    if (is_timed) {
        signed int(8) trackrefindex;
                unsigned int(32) movie_fragment_sequence_number
        unsigned int(32) samplenumber;
        unsigned int(8) priority;
        unsigned int(8) dependency_counter;
        unsigned int(32) offset;
        unsigned int(32) length;
        multiLayerInfo( );
    } else {
        unsigned int(16) item_ID;
    }
}
```

Table 3 shows a VQME box that provides per sample spatial quality information for N13992 according to this disclosure. The VQME box shown in Table 3 includes an if-loss-incurred-distortion metric that is computed from the differential distortion profile. The if-loss-incurred-distortion is shown in Table 3 as "unsigned int(8) priority".

TABLE 3

VQME Box Carrying the Temporal Distortion Information

```
aligned(8) class QualityMetricsPresentBox
            extends FullBox('vqmp', version, flags){
            unsigned int(8) field_size_bytes;
            unsigned int(8) metric_count;
            for (i = 1 ; i <= entry_count ; i++){
                    unsigned int(32) metric_code;
            }
}
```

Figure 10:
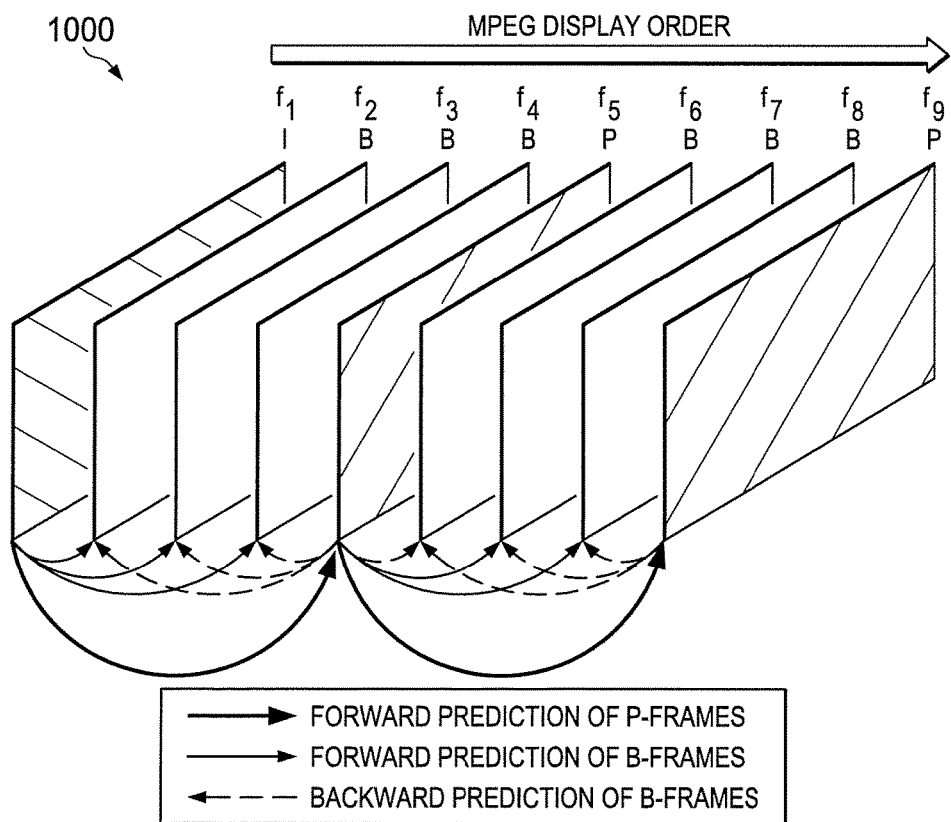
FIG. 10 illustrates an example group of frames according to this disclosure.

FIG. 10 illustrates an example group of frames 1000 according to this disclosure. The embodiment of the group of frames 1000 shown in FIG. 10 is for illustration only. Other groups of frames can be used without departing for the scope of this disclosure.

Modern video coding tools provide B-frames to facilitate frame drop as a way to adapt to a rate constraint. A selection to drop the same number of B frames from different content (such as the different documentaries of FIGS. 6A-6D) will have different visual impacts depending on the content itself. For example, the stationary talking head sequence of FIG. 6B can sustain more frame drops while maintaining a lower level of distortion than a more active sequence such as a football match.

As shown in FIG. 10, the sequence of frames 1000 is shown in MPEG display order. That is, in a $0^{th}$ hold playback, the frames $\{f_1, f_2, f_3, f_4, f_5, f_6, f_7, f_8, f_9\}$ are displayed at their respective timestamps $\{t_1, t_2, t_3, t_4, t_5, t_6, t_7, t_8, t_9\}$. The frames $\{f_1, f_2, f_3, f_4, f_5, f_6, f_7, f_8, f_9\}$ have a frame encoding structure as $\{I, B, B, B, P, B, B, B, P\}$. More particularly, the P-frames $f_5$ and the B-frames $\{f_2, f_3, f_4\}$ have a forward prediction decoding dependency from the I-frame $f_1$. If the I-frame $f_1$ is dropped or lost, a receiver will not be able to decode nor display the decoding-dependent frames $\{f_2, f_3, f_4, f_5\}$ to a user. Accordingly, when a network device shapes the sequence of frames 1000, a selection to drop the frame $f_1$ has the consequence of dropping the subset of frames $\{f_1, f_2, f_3, f_4, f_5\}$ that depend from the dropped frame $f_1$ and transmitting the remaining frames $\{f_1, f_6, f_7, f_8, f_9\}$ as a shaped sequence of frames. The user sees a playback sequence $\{f_1, f_6, f_7, f_8, f_9\}$ using the shaped sequence of frames that were not dropped. The distortion incurred as a result of dropping frame $f_1$ can be expressed by any one of Equations (1), (4), (6), (7), or (8), where each equation has a different level of precision to represent a human's visual perception as described above.

A similar consequence applies to the P-frame $f_5$ from which the B-frames $\{f_2, f_3, f_4\}$ have a backward prediction decoding dependency and to the B-frames $\{f_6, f_7, f_8\}$ and the P-frame $f_9$ that have a forward prediction decoding dependency. Also, a similar consequence applies to the P-frame $f_9$ from which the B-frames $\{f_6, f_7, f_8\}$ have a backward prediction decoding dependency. Different type of frames will have different visual impacts because of the differences in decoding dependence. That is, a selection to drop B-frames (such as frames $f_2$ and $f_3$) incurs a localized temporal distortion.

Figure 11:
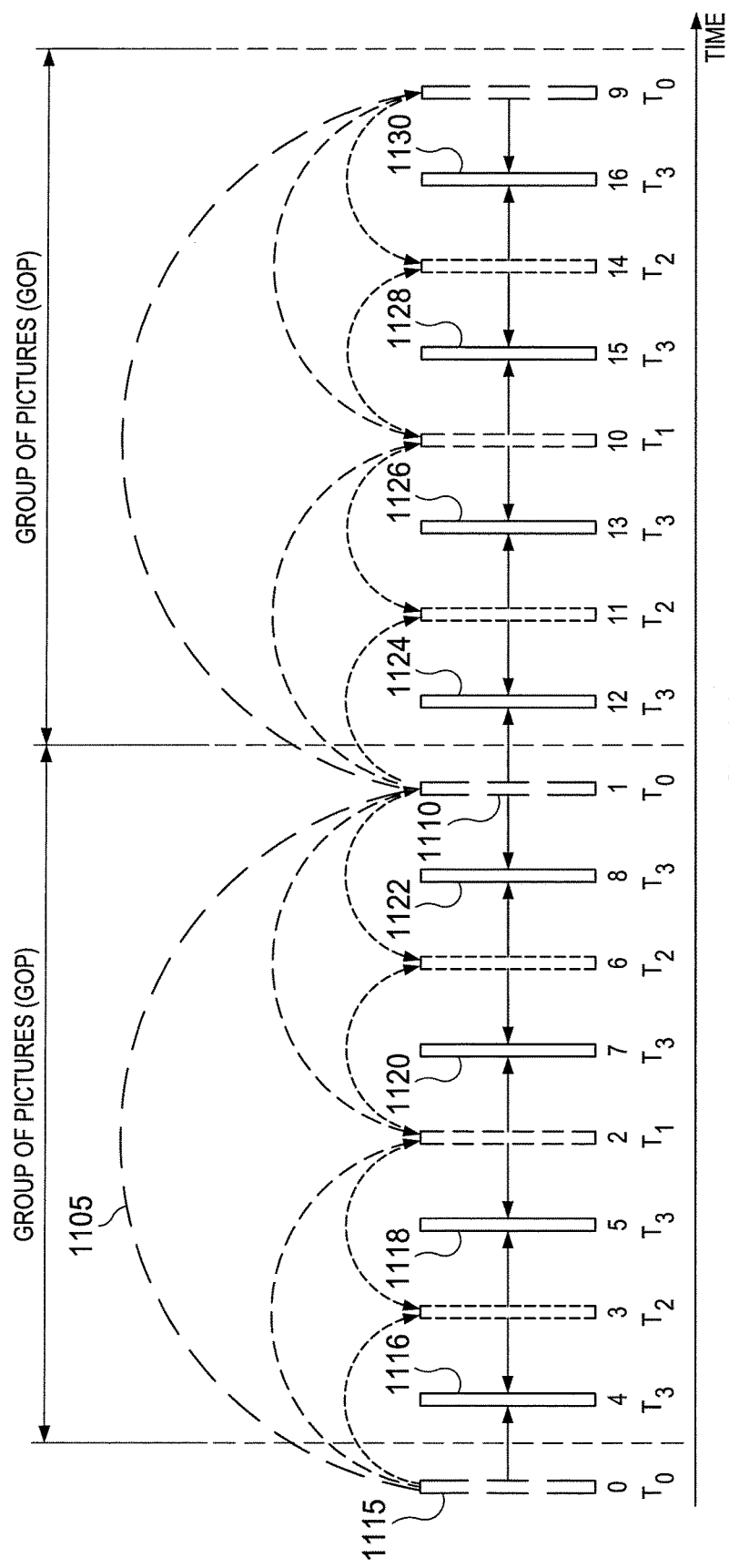
FIG. 11 illustrates an example hierarchical B-frame structure according to this disclosure.

FIG. 11 illustrates an example hierarchical B-frame structure 1100 according to this disclosure. The embodiment of the structure 1100 in FIG. 11 is for illustration only. Other embodiments could be used without departing from the scope of this disclosure. As shown in FIG. 11, the structure 1100 includes three GOPs, each having eight frames labeled with corresponding timestamps. Like FIG. 10, each arrow represents a decoding dependency. For example, an arrow 1105 represents a forward prediction decoding relationship in which a frame 1110 ($f_1$) depends from a frame 1115 ($f_0$). Each of frames 1116-1130 has decoding dependencies from the immediately prior frame and from the immediately following frame.

Figure 12:
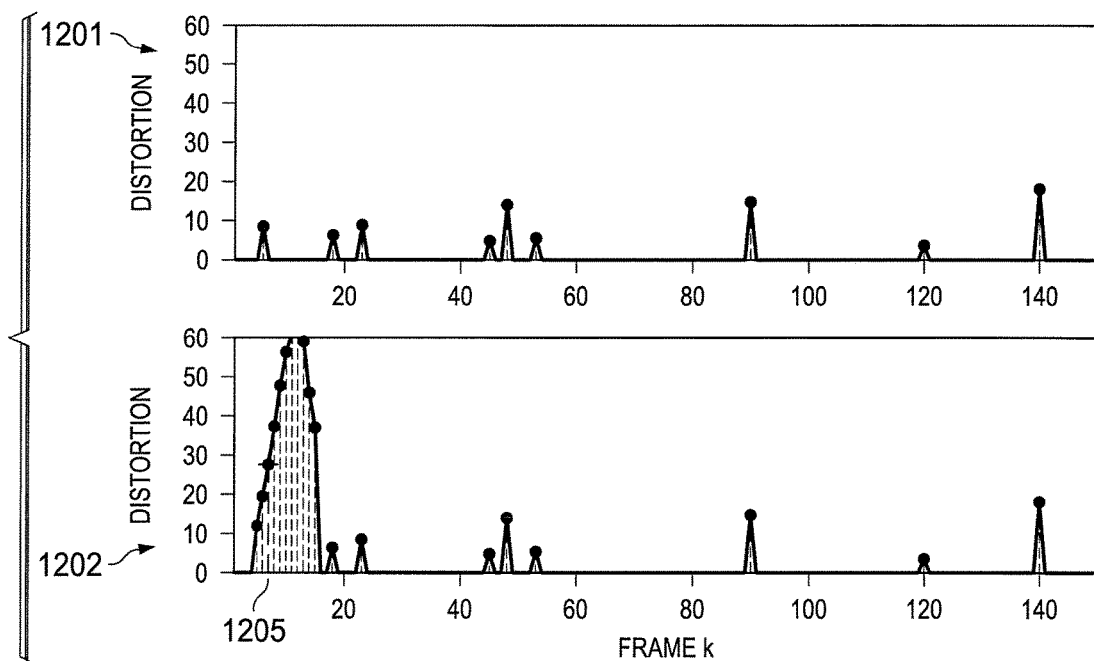
FIG. 12 illustrates example graphs of temporal distortion from the video sequence in FIG. 7B according to this disclosure.

FIG. 12 illustrates example graphs of temporal distortion from the video sequence in FIG. 7B according to this disclosure. The graphs include a frame index k on the horizontal axis and an amount of distortion on the vertical axis. A graph 1201 shows B-frame drop-induced distortions. A graph 1202 shows a vertical line 1205 indicating the I-frame induced distortion and also distortions from frames that have decoding dependence from that I-frame.

As described more particularly below, a QoE operating points descriptor can be added to the MMT ADC to enable multi-QoS traffic shaping with different spatio-temporal distortion levels for both single flow QoE optimization for the given QoS and multi-flow QoE optimization at a bottleneck. For streaming video applications, video coding tools perform streaming time adaption that operates the stream at multiple rate-distortion (R-D) points (such as certain combination of packets or MFU drops) that will result in different distortion consequences.

Figure 13A:
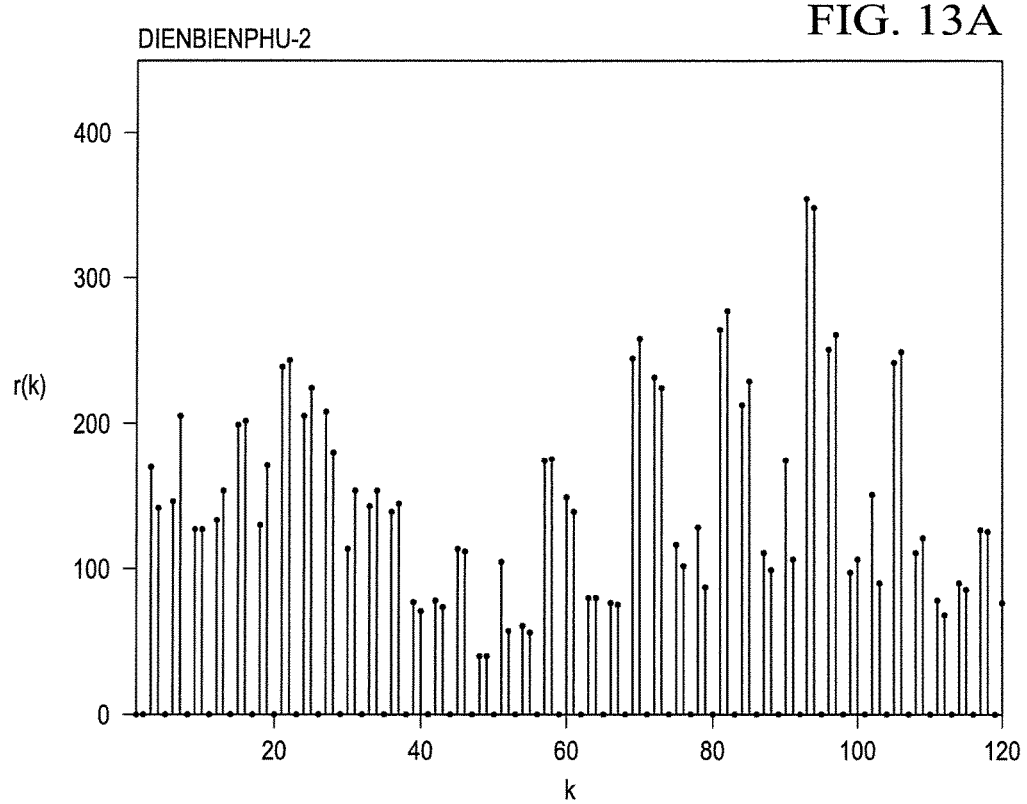
FIGS. 13A-13C illustrate graphs of example frame rate reductions associated with dropping B-frames of the video sequences in FIGS. 6A-6C according to this disclosure.
Figure 13B:
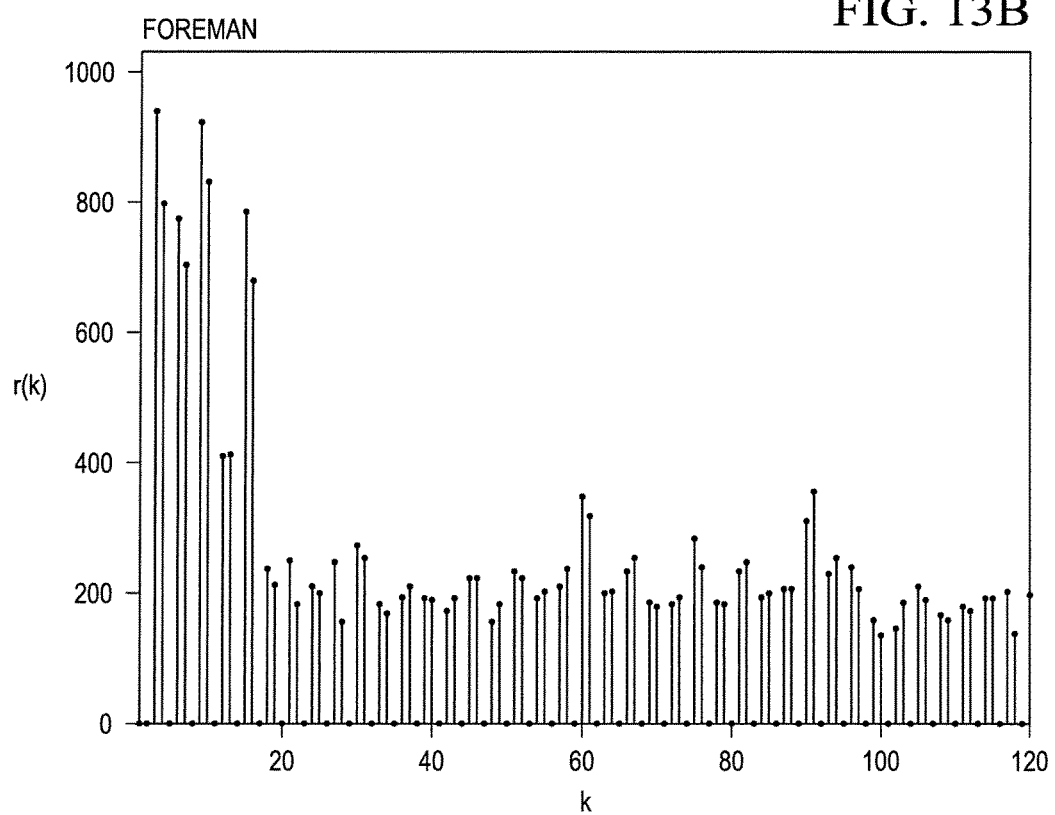
Figure 13C:
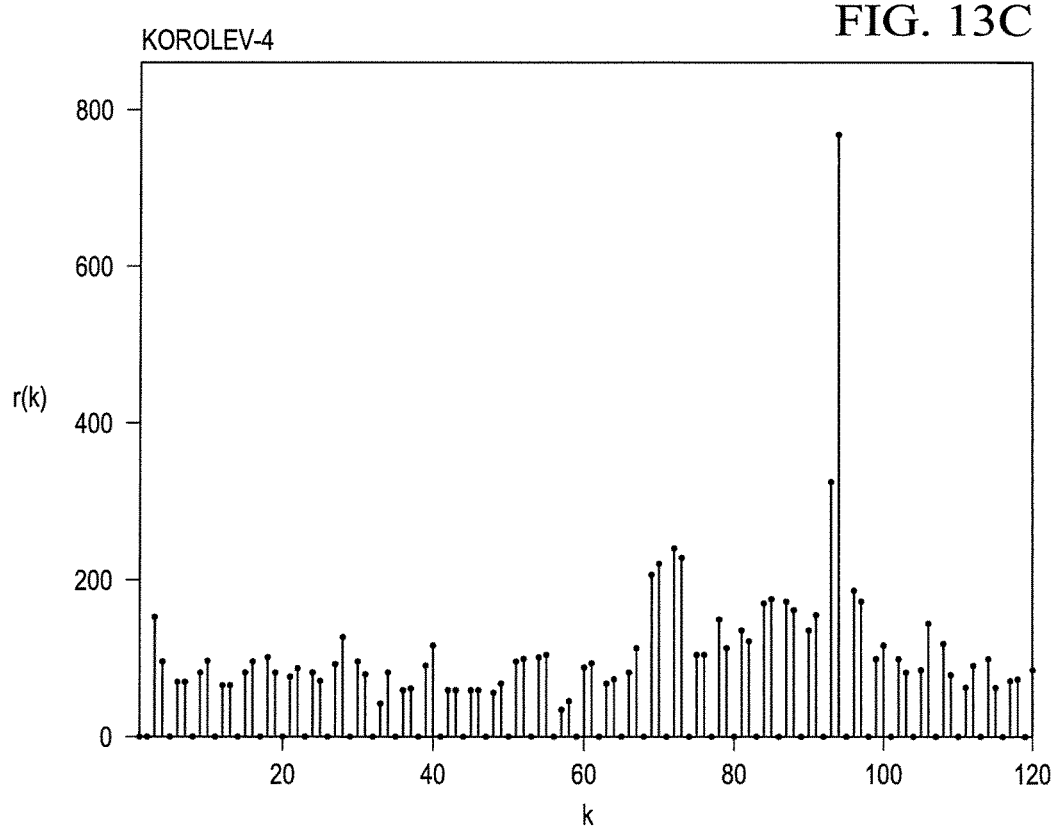

FIGS. 13A-13C illustrate graphs of example frame rate reductions associated with dropping B-frames of the video sequences in FIGS. 6A-6C according to this disclosure. The graphs include a frame index k on the horizontal axis and an amount of bitrate rate reduction per frame r(k) on the vertical axis. B-frames can account for 20-40% of the bit rates in a video sequence depending on the sequence encoding.

Figure 14A:
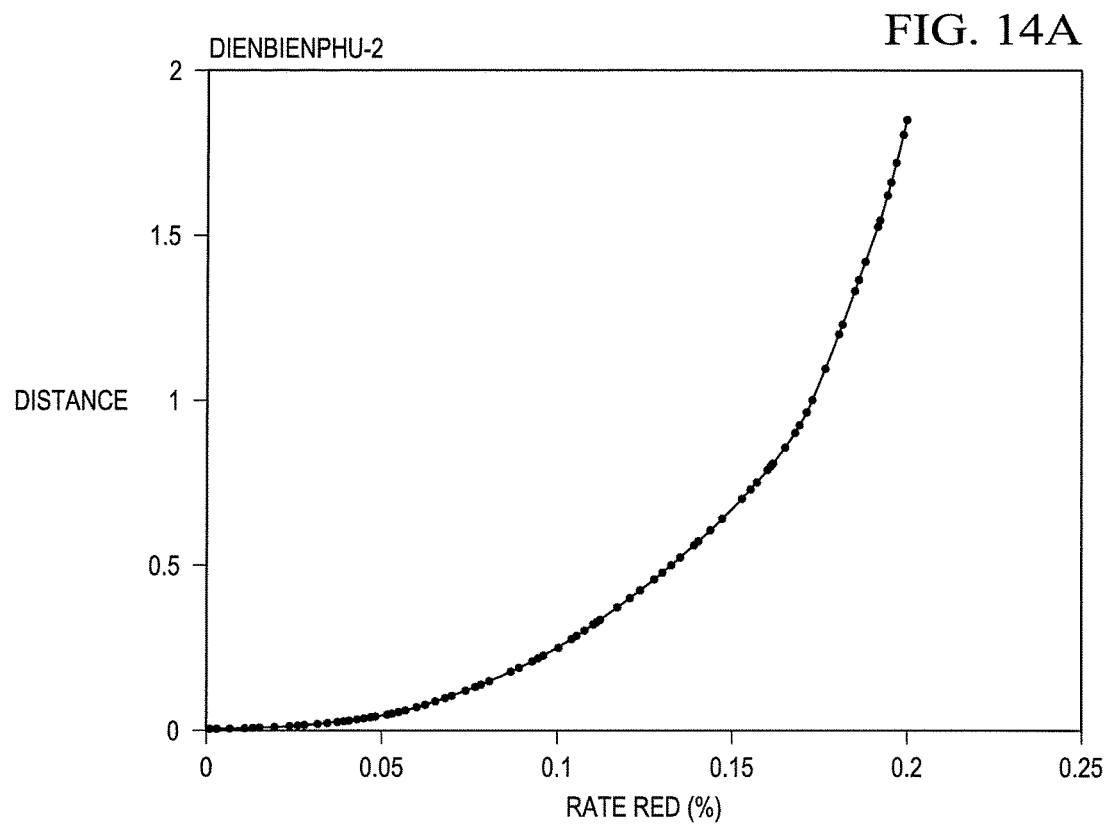
FIGS. 14A-14C illustrate graphs of example distortions as a function of frame rate reduction associated with dropping the B-frames of the video sequences in FIGS. 6A-6C according to this disclosure.
Figure 14B:
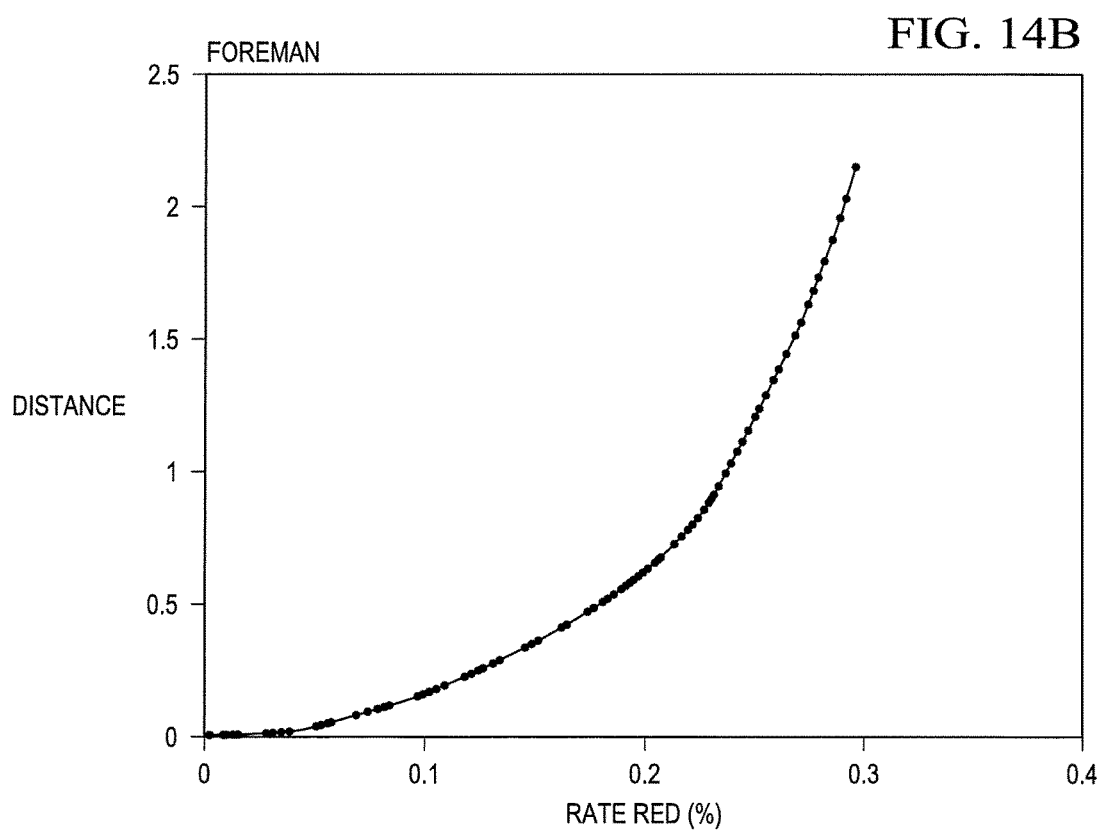
Figure 14C:
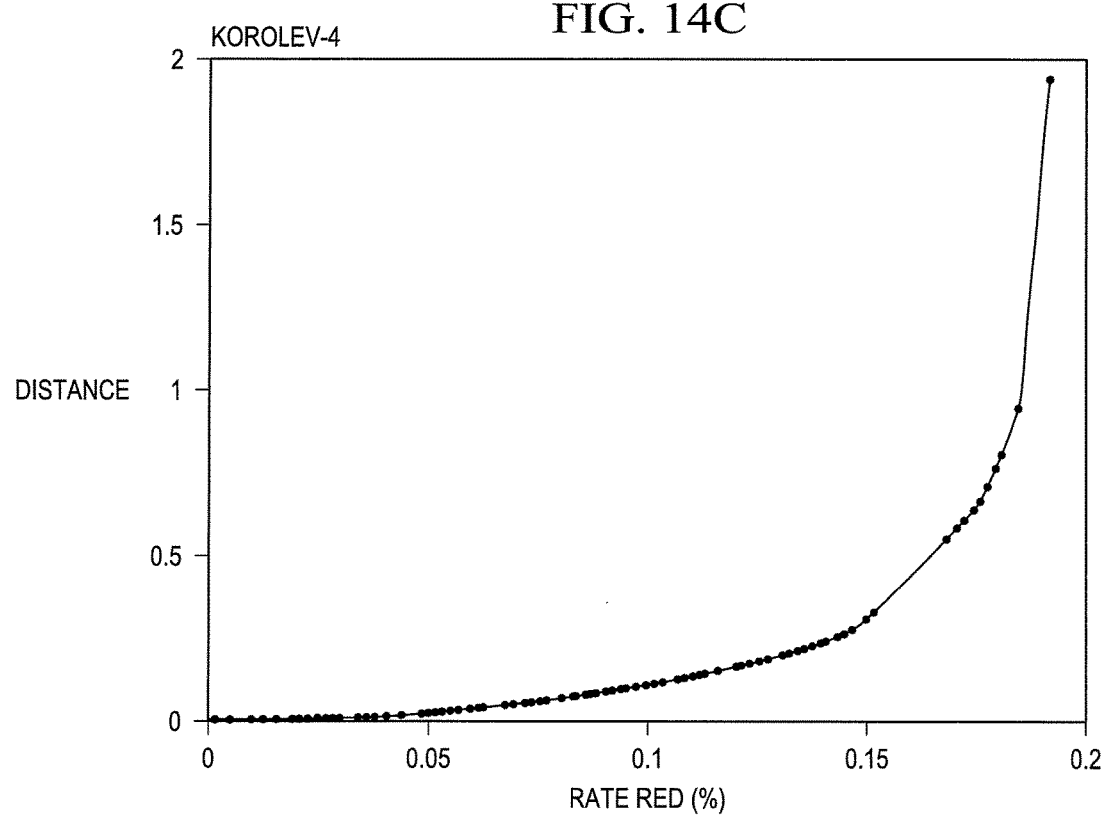

FIGS. 14A-14C illustrate graphs of example distortions as a function of frame rate reduction associated with dropping the B-frames of the video sequences in FIGS. 6A-6C according to this disclosure. The graphs in FIGS. 14A-14C are referred to as R-D curves, which are used to approximate the optimal R-D points from a gradient search. The gradient search includes sorting frames according to the ratio of FLTD over frame rate reduction. Accordingly, it is not necessary to transmit to generate a signal for every operating point.

Tables 3 and 4 provide syntax of an MMT ADC modified according to this disclosure to include operating points of rate reduction and a QoE descriptor for each operating point of rate reduction. Table 3 provides the operating points characteristics added to the MMT ADC. The MMT ADC shown in Table 3 includes multiple operating points specified with corresponding operating QoE parameters represented as "operationPointQuality," associated MFUs specified in the "sampleGroupIndex," and the resulting bit-rate represented by the "operationPointBitrate."

TABLE 3A

MMT ADC including Operating Points Characteristics

```
<xs:complexType name="mmt:OperationPointCharacteristics">
        <xs:attribute name="sampleGroupIndex"
        type="xs:integer"/>
        <xs:attribute name="operationPointQuality"
        type="xs:float"/>
        <xs:attribute name="operationPointBitrate"
        type="xs:integer"/>
        <xs:anyAttribute processContents="lax">
</xs:complexType>
```

Table 4 provides the syntax of the MMT ADC including the operating points characteristics of Table 3.

TABLE 4

MMT ADC Syntax Modified to Include R-D Operating Points

```
<?xml version="1.0" encoding="UTF-8"?>
<xs:schema xmlns:xs="http://www.w3.org/2001/XMLSchema"
targetNamespace="mmt">
     <xs:element name="AssetDeliveryCharacteristic"
type="mmt:AssetDeliveryCharacteristicType"/>
     <xs:complexType name="mmt:AssetDeliveryCharacteristicType">
         <xs:sequence>
             <xs:element name="asset" type="mmt:AssetType"
minOccurs="1" maxOccurs="unbounded"/>
             <xs:any processContent="lax" namespacee="##any"/>
         </xs:sequence>
     </xs:complexType>
     <xs:complexType name="mmt:AssetType">
         <xs:sequence>
             <xs:element name="QoS_descriptor"
type="mmt:QoS_descriptorType"/>
             <xs:element name="timeSegment" type="mmt:TimeSegment"
minOccurs="1" maxOccurs="unbounded"/>
         </xs:sequence>
     </xs:complexType>
     <xs:complexType name="mmt:TimeSegment">
         <xs:sequence>
             <xs:element name="Bitstream_descriptor"
type="mmt:Bitstream_descriptorType"/>
             <xs:element name="operationPointCharacteristics"
type="mmt:OperationPointCharacteristics" minOccurs="0" maxOccurs="unbounded"/>
         </xs:sequence>
         <xs:attribute name="startTime" type="xs:dateTime"/>
         <xs:attribute name="duration" type="xs:duration"/>
     </xs:complexType>
     <xs:complexType name="mmt:OperationPointCharacteristics">
         <xs:attribute name="sampleGroupIndex" type="xs:integer"/>
         <xs:attribute name="operationPointQuality" type="xs:float"/>
         <xs:attribute name="operationPointBitrate" type="xs:integer"/>
         <xs:anyAttribute processContents="lax">
     </xs:complexType>
     <xs:complexType name="mmt:QoS_descriptorType">
         <xs:attribute name="loss_tolerance" type="xs:integer"/>
         <xs:attribute name="jitter_sensitivity" type="xs:integer"/>
         <xs:attribute name="class_of_service" type="xs:boolean"/>
         <xs:attribute name="distortion_levels" type="xs:integer"/>
         <xs:attribute name="bidrection_indicator" type="xs:boolean"/>
     </xs:complexType>
     <xs:complexType name="Bitstream_descriptorType">
         <xs:choice>
             <xs:complexType name="Bitstream_descriptorVBRType">
                 <xs:attribute name="sustainable_rate" type="xs:float"/>
                 <xs:attribute name="buffer_size" type="xs:float"/>
                 <xs:attribute name="peak_rate" type="xs:float"/>
                 <xs:attribute name="max_MFU_size" type="xs:integer"/>
                 <xs:attribute name="mfu_period" type="xs:integer"/>
```

TABLE 4-continued

MMT ADC Syntax Modified to Include R-D Operating Points

```
            </xs:complexType>
            <xs:complexType name="Bitstream_descriptorCBRType">
                <xs:attribute name="peak_rate" type="xs:float"/>
                <xs:attribute name="max_MFU_size" type="xs:integer"/>
                <xs:attribute name="mfu_period" type="xs:integer"/>
            </xs:complexType>
        </xs:choice>
    </xs:complexType>
</xs:schema>
```

The ADC describes multiple assets of the same content, which can be used by the MMT transmitting entity to select the appropriate encoding or to perform bitstream switching when appropriate. An ADC is connected to multiple assets, which are intended to be alternatives to each other.

As video quality fluctuates over time, an accurate description of the bit-stream characteristics does not apply to the whole duration of the asset. The ADC modified according to this disclosure use time segments to provide the bit-stream description. The time segments are described by a corresponding start time inside the asset and a duration.

Depending on the encoding structure, the media data can be transmitted according to a partial delivery, where only parts of the media data are delivered to the MMT receiving device (such as user equipment) in order to adjust the transmission rate to the available channel bandwidth. The media samples of a particular operation point are grouped together using a sample grouping mechanism in the ISOB-MFF file. Each sample group can be associated with an indication of the expected quality when operating at that particular operation point. The indication of the expected quality can be provided as the resulting quality degradation when operating at the selected operation point. The sampleGroupIndex carries the group_description_index from the "sbgp" box that corresponds to the described operation point.

Figure 15:
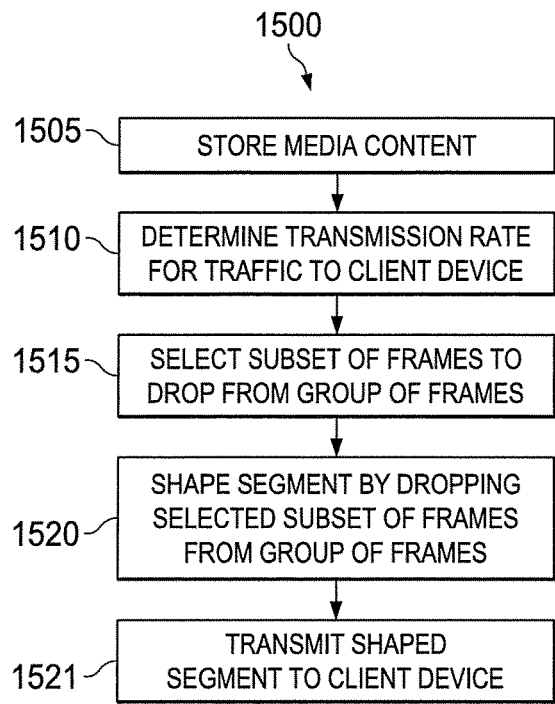
FIG. 15 illustrates an example process for providing media content in a computer network according to this disclosure.

FIG. 15 illustrates an example process 1500 for providing media content in a computer network according to this disclosure. The embodiment of the process 1500 shown in FIG. 15 is for illustration only. Other embodiments could be used without departing from the scope of this disclosure. For example, the process 1500 can be implemented by a client device transmitting a video sequence in live streaming application. As another example, the process 1500 can be implemented by a server or server-router transmitting a video sequence in non-live streaming application.

In block 1505, the process includes storing media content. The media content includes at least one segment, where each segment has at least one group of frames. Each segment can be stored in a memory unit. In block 1510, the process includes determining a transmission rate for traffic to a client device. For example, the client device could indicate a bitrate at which the client device is able to receive data over a communication link. The network device transmitting the media content can determine a transmission rate based on the indication from the receiving client device.

In block 1515, the process includes selecting a subset of frames to drop from the group of frames based on (i) the transmission rate and (ii) an FLTD metric of each frame in the subset of frames. The transmission rate indicates a bitrate to which the segment bitrate will be reduced. That is, a target bitrate reduction can be calculated as the difference between the bitrate of the segment and the transmission rate. Frames having a low FLTD metric can be selected for the subset of frames to drop first until the sum of the frame rate reductions of the subset rises to at least the target bitrate reduction.

In block 1520, the process includes shaping the segment by dropping the selected subset of frames from the group of frames, where the shaped segment has a lower bitrate than the segment. In block 1525, the process includes transmitting the shaped segment to the receiving client device.

Figure 16:
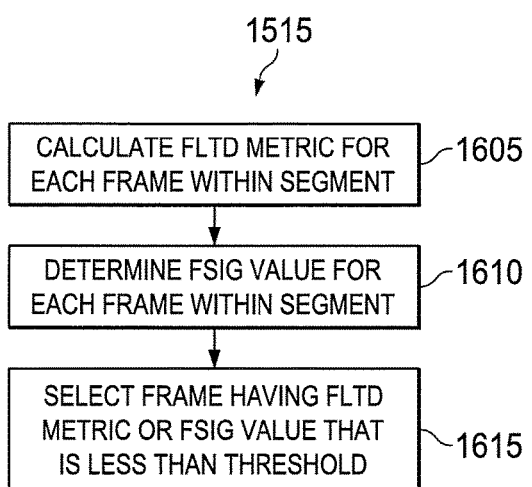
FIG. 16 illustrates an example process for selecting a subset of frames to drop from a group of frames according to this disclosure.

FIG. 16 illustrates an example process 1515 for selecting a subset of frames to drop from a group of frames according to this disclosure. The embodiment of the process 1515 shown in FIG. 16 is for illustration only. Other embodiments could be used without departing from the scope of this disclosure.

In block 1605, the process 1515 includes calculating an FLTD metric for each frame of a segment. For example, the FLTD can be calculated using Equation (1), (4), (6), (7), or (8). In block 1610, the process includes determining a sequence activity level within the segment using a differential significance of frames in the GOP. For example, a frame significance of each frame indicates the sequence activity level within the segment. In block 1610, an FSIG value can be calculated using the frame difference function. In block 1615, the process includes selecting a frame having an FLTD metric that is less than a threshold distortion level and/or a frame having an FSIG value that is less than a threshold significance level.

Although the figures above have described various systems, devices, and methods, various changes may be made to the figures. For example, the designs of various devices and systems could vary as needed or desired, such as when components of a device or system are combined, further subdivided, rearranged, or omitted and additional components are added. As another example, while various methods are shown as a series of steps, various steps in each method could overlap, occur in parallel, occur in a different order, or occur any number of times. In addition, the various graphs are for illustration only, and content having other characteristics can be used.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An apparatus for providing media content in a computer network, the apparatus comprising:
    a memory configured to store the media content, the media content including a segment comprising a group of frames; and
    at least one processing device configured to:
        determine a transmission rate for traffic between the apparatus and a client device;
        select a subset of frames to drop from the group of frames based on (i) the transmission rate and (ii) a frame difference distortion (FDIFF) metric of each frame in the subset of frames;

calculate a frame significance (FSIG) value that indicates a relative importance of the frames in the group of frames in a sequence, wherein the FSIG value is defined according to an equation:

$$v_k = d(f_k, f_{k-1}) = (S \cdot f_k - S \cdot f_{k-1})^T A^T A (S \cdot f_k - S \cdot f_{k-1}),$$

where $v_k$ is a vector representation of the FSIG value, $f_k$ denotes a $k^{th}$ frame, $f_{k-1}$, denotes a previous frame, S denotes a bi-cubicle filtering and down-sampling function, and A denotes a metric;

shape the segment by dropping the selected subset of frames from the group of frames, wherein the shaped segment has a lower bitrate than the segment; and initiate transmission of the shaped segment to the client device.

2. The apparatus of claim 1, wherein the FSIG value defines a temporal distortion of a frame corresponding to a timestamp t if the frame corresponding to the timestamp is lost.

3. The apparatus of claim 2, wherein the at least one processing device is configured to select, from the group of frames, a frame whose FSIG value is less than a threshold significance level.

4. The apparatus of claim 1, wherein the at least one processing device is further configured to determine a sequence activity level within the segment using a differential significance of frames in the group of frames.

5. The apparatus of claim 1, wherein the at least one processing device is further configured to:

receive the QoS description and the QoE description aggregated as the ADC, wherein each set of QoE parameters includes:
  a frame drop index set indicating a list of frames to drop from the group of frames yielding a bitrate reduction corresponding to the associated operating point,
  an aggregate bitrate resulting from the bitrate reduction obtained by dropping the frames indicated by the frame drop index set,
  a spatial distortion metric of the segment, and
  a frame significance weighted frame loss temporal distortion metric of the segment based on FSIG values; and select the operating point whose aggregate bitrate is closest to the transmission rate,
  wherein the at least one processing device is configured to select the subset of frames as the list of frames indicated by the frame drop index set of the selected operating point.

6. An apparatus for providing media content in a computer network, the apparatus comprising:

a memory configured to store the media content, the media content including a segment comprising a group of frames; and at least one processing device configured to:
  determine a transmission rate for traffic between the apparatus and a client device;
  select a subset of frames to drop from the group of frames based on (i) the transmission rate and (ii) a frame difference distortion (FDIFF) metric of each frame in the subset of frames;
  calculate the FDIFF metric according to an equation:

$$d(f_j, f_k) = (S \cdot f_j - S \cdot f_k)^T A^T A (S \cdot f_j - S \cdot f_k),$$

where $f_j$ denotes a frame actually being displayed, $f_k$ denotes a frame scheduled to be displayed, S denotes a bi-cubicle filtering and down-sampling function, and A denotes a metric;

shape the segment by dropping the selected subset of frames from the group of frames, wherein the shaped segment has a lower bitrate than the segment; and initiate transmission of the shaped segment to the client device.

7. The apparatus of claim 6 wherein the at least one processing device is configured to select, from the group of frames, a frame whose FDIFF metric is less than a threshold distortion level.

8. An apparatus for providing media content in a computer network, the apparatus comprising:

a memory configured to store the media content, the media content including a segment comprising a group of frames; and at least one processing device configured to:
  determine a transmission rate for traffic between the apparatus and a client device;
  select a subset of frames to drop from the group of frames based on (i) the transmission rate and (ii) a frame difference distortion (FDIFF) metric of each frame in the subset of frames;
  shape the segment by dropping the selected subset of frames from the group of frames, wherein the shaped segment has a lower bitrate than the segment; and
  initiate transmission of the shaped segment to the client device wherein:
  a frame loss temporal distortion (FLTD) metric is an F SIG-weighted FLTD metric based on frame significance (F SIG) values; and
  the at least one processing device is configured to calculate the F SIG-weighted FLTD metric according to an equation:

$$d(f_k, f_{k-p}) = \sum_{j=1}^{p} e^{-a(j-1)} v_k$$

where $f_{k-p}$, denotes a frame in the group of frames that is p frames prior to a $k^{th}$ frame, j denotes an index for a number of frames prior to the $k^{th}$ frame, e is Euler's number, and a represents a rate of exponential decay.

9. The apparatus of claim 8, wherein the at least one processing device is further configured to calculate the FSIG-weighted FLTD metric based on a number of dependent frames having a decoding dependency from an encoded frame in order to increase the FSIG-weighted FLTD metric for each of the dependent frames.

10. A system for providing media content in a computer network, the system comprising:

a memory configured to store the media content, the media content including a segment comprising a group of frames; and at least one processing device configured to:
  generate multiple operating points of bitrate reduction by performing a gradient search for each of the operating points;
  generate a set of Quality of Experience (QoE) parameters for each of the operating points, wherein the set QoE parameters for each of the operating points includes:
    a frame drop index set indicating a list of frames that when dropped from the group of frames yield (i) an aggregate bitrate reduction corresponding to the associated operating point and (ii) a shaped segment containing remaining frames; and at least one of:
an aggregate bitrate resulting from dropping the frames indicated by the frame drop index set,
a spatial distortion metric of the segment, and
a frame loss temporal distortion (FLTD) metric of the segment;
calculate a frame significance (FSIG) value that indicates a relative importance of the frames in the group of frames in a sequence, the FSIG value defined according to an equation:

$$v_k = d(f_k, f_{k-1}) = (S \cdot f_k - S \cdot f_{k-1})^T A^T A (S \cdot f_k - S \cdot f_{k-1}),$$

where $v_k$ is a vector representation of the FSIG value, $f_k$ denotes a $k^{th}$ frame, $f_{k-1}$ denotes a previous frame, S denotes a bi-cubicle filtering and down-sampling function, and A denotes a metric; and
initiate transmission of an Asset Delivery Characteristic (ADC) of the media content, the ADC including the operating points and the set of QoE parameters corresponding to each of the operating points.

11. The system of claim 10, wherein the at least one processing device is further configured to calculate for each frame in the segment:
a frame rate reduction;
a frame distortion; and
a frame loss gradient comprising a ratio of the frame distortion to the frame rate reduction.

12. The system of claim 11, wherein the at least one processing device is configured, when performing the gradient search for each of the operating points, to:
sort the group of frames by frame loss gradient; and
generate a list of frames that when dropped from the group of frames yields an aggregate bitrate reduction corresponding to the operating point, the at least one processing device configured to generate the list of frames by (i) adding a frame having a smallest frame loss gradient to the list of frames and (ii) repeatedly adding a next frame from the sorted group of frames to the list of frames until a sum of the frame rate reductions of the frames added to the list of frames is at least the bitrate reduction corresponding to the operating point.

13. The system of claim 10, wherein the frame drop index set comprises one of:
an index of each remaining frame; and
an index of the frames to be dropped from the group of frames.

14. The system of claim 10, wherein the at least one processing device is configured to select, from the group of frames, a frame having at least one of:
an FSIG value less than a threshold significance level; and
a FLTD metric less than a threshold distortion level.

15. The system of claim 10, wherein:
the FLTD metric is an FSIG-weighted FLTD metric; and
the at least one processing device is configured to calculate the FSIG-weighted FLTD metric according to an equation:

$$d(f_k, f_{k-p}) = \sum_{j=1}^{p} e^{-a(j-1)} v_k$$

where $f_{k-p}$ denotes a frame in the group of frames that is p frames prior to the $k^{th}$ frame, j denotes an index for a number of frames prior to the $k^{th}$ frame, e is Euler's number, and c represents a rate of exponential decay.

16. The system of claim 15, wherein the at least one processing device is further configured to calculate the FSIG-weighted FLTD metric based on a number of dependent frames having a decoding dependency from an encoded frame in order to increase the FSIG-weighted FLTD metric for each of the dependent frames.

17. The system of claim 10, further comprising a router configured to:
receive the transmitted ADC;
determine a transmission rate for traffic between the router and a client device;
select a subset of frames to drop from the group of frames based on (i) the transmission rate and (ii) a frame loss temporal distortion (FLTD) metric of each frame in the subset of frames;
shape the segment by dropping the selected subset of frames from the group of frames, wherein the shaped segment has a lower bitrate than the segment; and
initiate transmission of the shaped segment to the client device.

18. The system of claim 17, wherein:
the router is further configured to select the operating point whose aggregate bitrate is closest to the transmission rate; and
the router is configured to select the subset of frames as a list of frames indicated by a frame drop index set associated with the selected operating point.

* * * * *